US012795014B2

(12) United States Patent
Jin et al.

(10) Patent No.: US 12,795,014 B2
(45) Date of Patent: Nov. 10, 2026

(54) AUDIO CONTROL METHOD, ELECTRONIC DEVICE, AUDIO DEVICE, AND STORAGE MEDIUM

(71) Applicant: HUAWEI TECHNOLOGIES CO., LTD., Guangdong (CN)

(72) Inventors: Meng Jin, Shanghai (CN); Long Li, Shanghai (CN); Guanjun Ni, Shanghai (CN)

(73) Assignee: Huawei Technologies Co., LTD., Shenzhen (CN)

(*) Notice: Subject to any disclaimer, the term of this patent is extended or adjusted under 35 U.S.C. 154(b) by 356 days.

(21) Appl. No.: 18/291,817

(22) PCT Filed: Jul. 25, 2022

(86) PCT No.: PCT/CN2022/107639
§ 371 (c)(1),
(2) Date: Jan. 24, 2024

(87) PCT Pub. No.: WO2023/005880
PCT Pub. Date: Feb. 2, 2023

(65) Prior Publication Data

US 2024/0364803 A1 Oct. 31, 2024

(30) Foreign Application Priority Data

Jul. 28, 2021 (CN) ......................... 202110860304.5

(51) Int. Cl.
*H04M 1/72412* (2021.01)
*G06F 3/16* (2006.01)
*H04M 1/60* (2006.01)

(52) U.S. Cl.
CPC ........ *H04M 1/72412* (2021.01); *G06F 3/165* (2013.01); *H04M 1/6066* (2013.01)

(58) Field of Classification Search
CPC . H04M 1/72412; H04M 1/6066; G06F 3/165; H04L 65/1094; H04R 1/1041;
(Continued)

(56) References Cited

U.S. PATENT DOCUMENTS

2014/0106667 A1* 4/2014 Sarkissian ............... H04W 4/16 455/39
2022/0201113 A1* 6/2022 Peng .................... H04M 1/6066
2022/0232653 A1* 7/2022 Zhang .................... H04W 76/34

FOREIGN PATENT DOCUMENTS

CN 107977185 A 5/2018
CN 108268233 A 7/2018
(Continued)

OTHER PUBLICATIONS

Extended European Search Report in European Appln No. 22848485.3, dated Jul. 5, 2024, 11 pages.

*Primary Examiner* — Fayyaz Alam
(74) *Attorney, Agent, or Firm* — Fish & Richardson P.C.

(57) ABSTRACT

This application provides an audio control method, an electronic device, an audio device, and a storage medium. An example method for audio control is applied to an audio device, where the audio device establishes a first Bluetooth connection to a first electronic device, and establishes a second Bluetooth connection to a second electronic device. In the method, in response to determining that a status of the audio device changes, the audio device sends a status notification message to at least one of the first electronic device or the second electronic device, where the status notification message indicates a current status of the audio device.

20 Claims, 23 Drawing Sheets

(58) Field of Classification Search
CPC .. H04R 2420/07; H04W 76/14; H04W 76/15; H04W 4/80
See application file for complete search history.

(56) References Cited

FOREIGN PATENT DOCUMENTS

| | | | | | |
|---|---|---|---|---|---|
| CN | 110191442 | A | * | 8/2019 | ............ H04W 76/10 |
| WO | 2020211733 | A1 | | 10/2020 | |

* cited by examiner

Mobile phone 1 (Scenario 4)

Mobile phone 1 (Scenario 6)

Mobile phone 2 (Scenario 3, Scenario 4)

Mobile phone 2 (Scenario 5)

AUDIO CONTROL METHOD, ELECTRONIC DEVICE, AUDIO DEVICE, AND STORAGE MEDIUM

CROSS-REFERENCE TO RELATED APPLICATIONS

This application is a National Stage of International Application No. PCT/CN2022/107639, filed on Jul. 25, 2022, which claims priority to Chinese Patent application Ser. No. 20/211,0860304.5, filed on Jul. 28, 2021, both of which are hereby incorporated by reference in their entireties.

TECHNICAL FIELD

Embodiments of this application relate to the field of communication technologies, and in particular, to an audio control method, an electronic device, an audio device, and a storage medium.

BACKGROUND

With popularization of electronic devices, a user may simultaneously connect a plurality of electronic devices to an audio device. For example, the user simultaneously connects a mobile phone, a tablet, and a computer to a Bluetooth headset. The Bluetooth headset is connected to a plurality of electronic devices, but only a service of one electronic device can be performed at a time. If the plurality of electronic devices all expect to perform a service on the Bluetooth headset, preemptive use of the Bluetooth headset is involved.

Currently, in a scenario in which an electronic device preempts an audio device, a high-priority service may be suspended or interrupted, or cannot preempt use of the audio device, and consequently, an actual use requirement of an audio service cannot be met.

SUMMARY

Embodiments of this application provide an audio control method, an electronic device, an audio device, and a storage medium, to meet an actual use requirement of an audio service.

According to a first aspect, an audio control method is provided, applied to an audio device, where the audio device establishes a first Bluetooth connection to a first electronic device, and establishes a second Bluetooth connection to a second electronic device. The method includes: generating a status notification message when determining that a status of the audio device changes, where the status notification message indicates a current status of the audio device; and sending a status notification message to at least one of the first electronic device and the second electronic device.

The audio control method provided in the first aspect is applied to a scenario in which the audio device has established Bluetooth connections to a plurality of electronic devices. If the status of the audio device changes, the audio device sends a status notification message to the electronic device, to notify the electronic device of an accurate status of the audio device in a timely manner. In this way, the electronic device can sense the accurate status of the audio device, so that the electronic device or a user properly preempts the audio device subsequently. This prevents a high-priority service from being suspended, being interrupted, or failing to preempt use of the audio device, and meets an actual use requirement of an audio service.

In a possible implementation, that a status of the audio device changes includes: The audio device changes from an idle state to a play state; or the audio device changes from a play state to an idle state.

In a possible implementation, if the current status is a play state, the status notification message includes a service type of an audio service currently processed by the audio device and device information of an electronic device initiating the audio service; or if the current status is an idle state, the status notification message indicates that the audio device is in the idle state.

In this implementation, if the current status of the audio device is the play state, the audio device notifies, in a timely manner, an electronic device in an audio control system of a type of an audio service that is being processed and information about a related electronic device, so that the electronic device can sense the accurate status of the audio device.

In a possible implementation, the sending a status notification message to at least one of the first electronic device and the second electronic device includes: sending the status notification message to an electronic device in a non-service state, where the electronic device in the non-service state is an electronic device that is in the first electronic device and the second electronic device and that does not perform an audio service on the audio device.

In this implementation, an electronic device that performs an audio service on the audio device learns a status of the audio device, and sends the status notification message to the electronic device in the non-service state, so that each electronic device in the audio control system can sense the accurate status of the audio device.

In a possible implementation, the electronic device in the non-service state includes: an electronic device that does not initiate an audio service; and/or an electronic device that initiates an audio service but does not perform the audio service on the audio device.

In a possible implementation, the audio device is in the idle state before the status of the audio device changes, and before the determining that a status of the audio device changes, the method further includes: receiving a first message sent by the first electronic device, where the first message is used to request the audio device to perform a first audio service of the first electronic device.

In this implementation, the audio device is originally in the idle state, and the first electronic device may preempt the audio device in the idle state by sending the first message.

In a possible implementation, the receiving a first message sent by the first electronic device includes: receiving the first message sent by the first electronic device through an echo channel of an L2CAP.

In this implementation, the first message is sent through the echo channel, so that a success rate of transmitting the first message is improved.

In a possible implementation, the sending a status notification message to at least one of the first electronic device and the second electronic device includes: sending the status notification message to the second electronic device, where the status notification message includes a service type of the first audio service and device information of the first electronic device.

In this implementation, the second electronic device is an electronic device in a non-service state. The status notification message is sent to the second electronic device, so that the second electronic device can sense the accurate status of the audio device.

In a possible implementation, the method further includes: receiving a first audio stream that is of the first audio service and that is sent by the first electronic device; and playing the first audio stream.

In a possible implementation, the audio device processes the first audio service of the first electronic device before the status of the audio device changes, and before the determining that a status of the audio device changes, the method further includes: receiving a second message sent by the second electronic device, where the second message is used to request the audio device to perform a second audio service of the second electronic device, and a priority of the second audio service is higher than a priority of the first audio service.

In this implementation, the audio device is originally in the play state, and processes the first audio service of the first electronic device. The second electronic device initiates the second audio service with a higher priority. The second electronic device sends the first message, so that a high-priority service preempts use of the audio device, and an actual use requirement of an audio service is met.

In a possible implementation, the sending a status notification message to at least one of the first electronic device and the second electronic device includes: sending the status notification message to the first electronic device, where the status notification message includes a service type of the second audio service and device information of the second electronic device.

In this implementation, the first electronic device is an electronic device in a non-service state. The status notification message is sent to the first electronic device, so that the first electronic device can sense the accurate status of the audio device.

In a possible implementation, the method further includes: receiving a second audio stream that is of the second audio service and that is sent by the second electronic device; and playing the second audio stream.

According to a second aspect, an audio control method is provided, applied to a first electronic device, where the first electronic device establishes a first Bluetooth connection to an audio device, and the audio device further establishes a second Bluetooth connection to a second electronic device. The method includes: receiving a status notification message sent by the audio device, where the status notification message indicates a current status of the audio device; and displaying notification information based on the status notification message, where the notification information indicates the current status of the audio device.

The audio control method provided in the second aspect is applied to a scenario in which the audio device has established Bluetooth connections to a plurality of electronic devices. The electronic device may learn an accurate status of the audio device by receiving the status notification message sent by the audio device, and notify a user of the accurate status of the audio device in a timely manner. In this way, the electronic device or a user may properly preempt the audio device. This prevents a high-priority service from being suspended, being interrupted, or failing to preempt use of the audio device, and meets an actual use requirement of an audio service.

In a possible implementation, when the current status is a play state, the status notification message includes a service type of an audio service currently processed by the audio device and device information of an electronic device initiating the audio service, and the notification information specifically indicates the audio device to process the audio service of the electronic device, where the electronic device is the first electronic device or the second electronic device.

In a possible implementation, when the current status is an idle state, the status notification message indicates that the audio device is in the idle state, and the notification information specifically indicates that the audio device is in the idle state.

In a possible implementation, the first electronic device is an electronic device in a non-service state, and the electronic device in the non-service state is an electronic device that does not perform an audio service on the audio device.

In a possible implementation, the first electronic device does not initiate an audio service; or the first electronic device initiates an audio service but does not perform the audio service on the audio device.

In a possible implementation, the method further includes: sending a first message to the audio device when determining, based on the current status, that the audio device can perform a first audio service of the first electronic device, where the first message is used to request the audio device to perform the first audio service of the first electronic device.

In a possible implementation, the sending a first message to the audio device includes: sending the first message to the audio device through an echo channel of a logical link control and adaptation protocol L2CAP.

In a possible implementation, the determining, based on the current status, that the audio device can perform a first audio service of the first electronic device includes: if the current status is the idle state, determining that the audio device can perform the first audio service.

In a possible implementation, the determining, based on the current status, that the audio device can perform a first audio service of the first electronic device includes: if the audio device currently processes a second audio service of the second electronic device, when a priority of the first audio service is higher than a priority of the second audio device, determining that the audio device can perform the first audio service.

According to a third aspect, an audio control method is provided, applied to an audio device. The method includes: establishing a Bluetooth connection to a first electronic device; and sending a first status notification message to the first electronic device when the audio device is in a play state, where the first status notification message includes a service type of a first audio service currently processed by the audio device and device information of a second electronic device initiating the first audio service.

The audio control method provided in the third aspect is applied to a scenario in which the audio device initially establishes a Bluetooth connection to an electronic device. If the audio device is in the play state, the audio device sends a status notification message to the electronic device, to notify the electronic device of an accurate status of the audio device in a timely manner. In this way, the electronic device can sense the accurate status of the audio device, so that the electronic device or a user properly preempts the audio device subsequently. This prevents a high-priority service from being suspended, being interrupted, or failing to preempt use of the audio device, and meets an actual use requirement of an audio service.

In a possible implementation, the method further includes: sending a second status notification message to the first electronic device when the audio device is in an idle state, where the second status notification message indicates that the audio device is in the idle state.

In this implementation, if the audio device is in the idle state, the audio device sends a status notification message to the electronic device, to notify the electronic device of an accurate status of the audio device in a timely manner.

According to a fourth aspect, an audio control method is provided, applied to a first electronic device. The method includes: establishing a Bluetooth connection to an audio device; receiving a first status notification message sent by the audio device, where the first status notification message includes a service type of a first audio service currently processed by the audio device and device information of a second electronic device initiating the first audio service; and displaying first notification information based on the first status notification message, where the first notification information indicates the audio device to process the first audio service of the second electronic device.

The audio control method provided in the fourth aspect is applied to a scenario in which the audio device initially establishes a Bluetooth connection to an electronic device. If the audio device is in a play state, the electronic device may learn an accurate status of the audio device by receiving the status notification message sent by the audio device, and notify a user of the accurate status of the audio device in a timely manner. In this way, the electronic device or a user may properly preempt the audio device. This prevents a high-priority service from being suspended, being interrupted, or failing to preempt use of the audio device, and meets an actual use requirement of an audio service.

In a possible implementation, the method further includes: receiving a second status notification message sent by the audio device, where the second status notification message indicates that the audio device is in an idle state.

In a possible implementation, the method further includes: if no status notification message sent by the audio device is received within preset duration, determining that the audio device is in the idle state.

In this implementation, if the audio device is in the idle state, the audio device may not send a status notification message to the electronic device. Correspondingly, if the electronic device does not receive, within the preset duration, the status notification message sent by the audio device, the electronic device determines that the audio device is in the idle state, and obtains the accurate status of the audio device.

In a possible implementation, the method further includes: displaying second notification information, where the second notification information indicates that the audio device is in the idle state.

In this implementation, if the audio device is in the idle state, the second notification information is displayed, to notify the user of the accurate status of the audio device in a timely manner.

According to a fifth aspect, an audio device is provided, where the audio device establishes a first Bluetooth connection to a first electronic device, and establishes a second Bluetooth connection to a second electronic device. The audio device includes: a processing module, configured to generate a status notification message when determining that a status of the audio device changes, where the status notification message indicates a current status of the audio device; and a sending module, configured to send a status notification message to at least one of the first electronic device and the second electronic device.

In a possible implementation, that a status of the audio device changes includes: The audio device changes from an idle state to a play state; or the audio device changes from a play state to an idle state.

In a possible implementation, if the current status is a play state, the status notification message includes a service type of an audio service currently processed by the audio device and device information of an electronic device initiating the audio service; or if the current status is an idle state, the status notification message indicates that the audio device is in the idle state.

In a possible implementation, the sending module is specifically configured to send the status notification message to an electronic device in a non-service state, where the electronic device in the non-service state is an electronic device that is in the first electronic device and the second electronic device and that does not perform an audio service on the audio device.

In a possible implementation, the electronic device in the non-service state includes: an electronic device that does not initiate an audio service; and/or an electronic device that initiates an audio service but does not perform the audio service on the audio device.

In a possible implementation, the audio device is in the idle state before the status of the audio device changes. The audio device further includes a receiving module, and the receiving module is configured to receive a first message sent by the first electronic device, where the first message is used to request the audio device to perform a first audio service of the first electronic device.

In a possible implementation, the receiving module is specifically configured to receive the first message sent by the first electronic device through an echo channel of an L2CAP.

In a possible implementation, the sending module is specifically configured to send the status notification message to the second electronic device, where the status notification message includes a service type of the first audio service and device information of the first electronic device.

In a possible implementation, the receiving module is further configured to receive a first audio stream that is of the first audio service and that is sent by the first electronic device; and the processing module is further configured to play the first audio stream.

In a possible implementation, the audio device processes the first audio service of the first electronic device before the status of the audio device changes. The audio device further includes a receiving module, and the receiving module is configured to receive a second message sent by the second electronic device, where the second message is used to request the audio device to perform a second audio service of the second electronic device, and a priority of the second audio service is higher than a priority of the first audio service.

In a possible implementation, the sending module is specifically configured to send the status notification message to the first electronic device, where the status notification message includes a service type of the second audio service and device information of the second electronic device.

In a possible implementation, the receiving module is further configured to receive a second audio stream that is of the second audio service and that is sent by the second electronic device; and the processing module is further configured to play the second audio stream.

According to a sixth aspect, an electronic device is provided, to serve as a first electronic device, where the first electronic device establishes a first Bluetooth connection to an audio device, and the audio device further establishes a second Bluetooth connection to a second electronic device. A first electronic audio device includes: a receiving module, configured to receive a status notification message sent by the audio device, where the status notification message indicates a current status of the audio device; and a processing module, configured to display notification information based on the status notification message, where the notification information indicates the current status of the audio device.

In a possible implementation, when the current status is a play state, the status notification message includes a service type of an audio service currently processed by the audio device and device information of an electronic device initiating the audio service, and the notification information specifically indicates the audio device to process the audio service of the electronic device, where the electronic device is the first electronic device or the second electronic device.

In a possible implementation, when the current status is an idle state, the status notification message indicates that the audio device is in the idle state, and the notification information specifically indicates that the audio device is in the idle state.

In a possible implementation, the first electronic device is an electronic device in a non-service state, and the electronic device in the non-service state is an electronic device that does not perform an audio service on the audio device.

In a possible implementation, the first electronic device does not initiate an audio service; or the first electronic device initiates an audio service but does not perform the audio service on the audio device.

In a possible implementation, the first electronic device further includes a sending module. When the processing module determines, based on the current status, that the audio device can perform a first audio service of the first electronic device, the sending module is configured to send a first message to the audio device, where the first message is used to request the audio device to perform the first audio service of the first electronic device.

In a possible implementation, the sending module is specifically configured to send the first message to the audio device through an echo channel of an L2CAP.

In a possible implementation, the processing module is specifically configured to: if the current status is the idle state, determine that the audio device can perform the first audio service.

In a possible implementation, the processing module is specifically configured to: if the audio device currently processes a second audio service of the second electronic device, when a priority of the first audio service is higher than a priority of the second audio device, determine that the audio device can perform the first audio service.

According to a seventh aspect, an audio device is provided, including: a processing module, configured to establish a Bluetooth connection to a first electronic device; and a sending module, configured to send a first status notification message to the first electronic device when the audio device is in a play state, where the first status notification message includes a service type of a first audio service currently processed by the audio device and device information of a second electronic device initiating the first audio service.

In a possible implementation, the sending module is further configured to send a second status notification message to the first electronic device when the audio device is in an idle state, where the second status notification message indicates that the audio device is in the idle state.

According to an eighth aspect, an electronic device is provided, to serve as a first electronic device, including: a processing module, configured to establish a Bluetooth connection to an audio device; and a receiving module, configured to receive a first status notification message sent by the audio device, where the first status notification message includes a service type of a first audio service currently processed by the audio device and device information of a second electronic device initiating the first audio service. The processing module is further configured to display first notification information based on the first status notification message, where the first notification information indicates the audio device to process the first audio service of the second electronic device.

In a possible implementation, the receiving module is further configured to receive a second status notification message sent by the audio device, where the second status notification message indicates that the audio device is in an idle state.

In a possible implementation, the processing module is further configured to: if the receiving module does not receive a status notification message sent by the audio device within preset duration, determine that the audio device is in the idle state.

In a possible implementation, the processing module is further configured to display second notification information, where the second notification information indicates that the audio device is in the idle state.

According to a ninth aspect, an audio device is provided. The audio device includes a processor, and the processor is configured to: be coupled to a memory, read instructions in the memory, and enable, based on the instructions, the audio device to perform the method provided in the first aspect or the third aspect.

According to a tenth aspect, an electronic device is provided. The electronic device includes a processor, and the processor is configured to: be coupled to a memory, read instructions in the memory, and enable, based on the instructions, the electronic device to perform the method provided in the second aspect or the fourth aspect.

According to an eleventh aspect, a program is provided. When being executed by a processor, the program is used to perform the method provided in the first aspect, the second aspect, the third aspect, or the fourth aspect.

According to a twelfth aspect, a computer-readable storage medium is provided. The computer-readable storage medium stores instructions. When the instructions are run on a computer or a processor, the method provided in the first aspect, the second aspect, the third aspect, or the fourth aspect is implemented.

According to a thirteenth aspect, a program product is provided. The program product includes a computer program, the computer program is stored in a readable storage medium, at least one processor of a device can read the computer program from the readable storage medium, and the at least one processor executes the computer program to enable the device to implement the method provided in the first aspect, the second aspect, the third aspect, or the fourth aspect.

DESCRIPTION OF EMBODIMENTS

The following describes embodiments of this application with reference to accompanying drawings.

Figure 1:
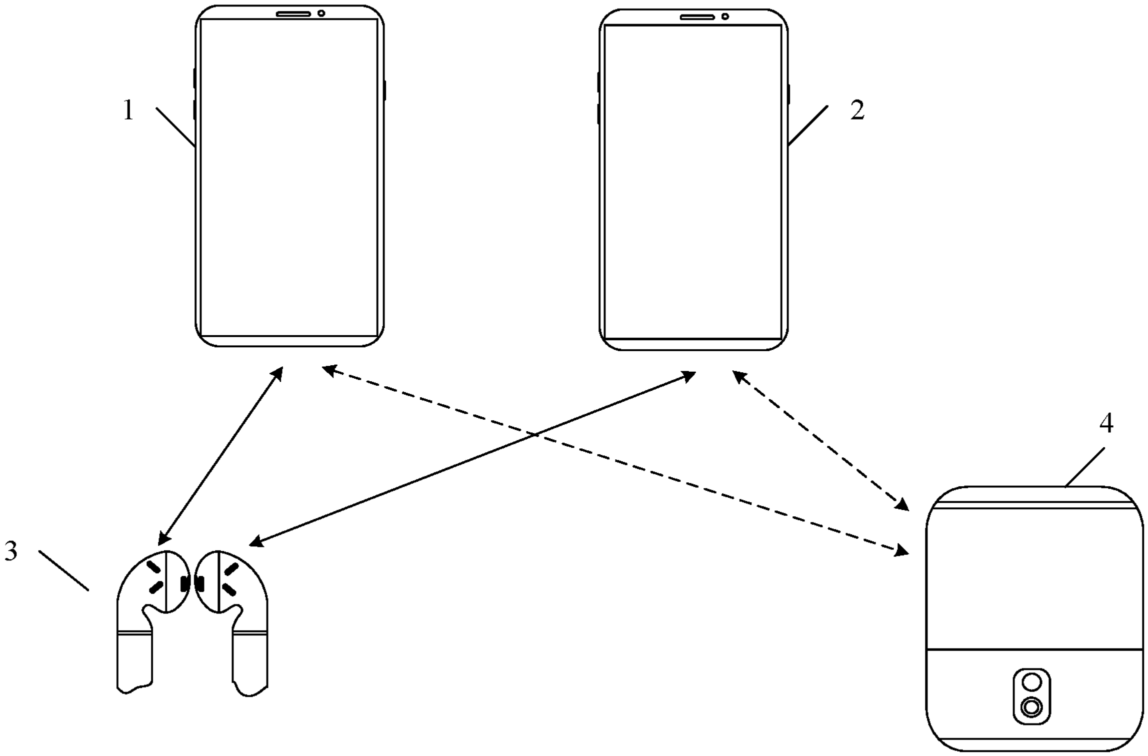
FIG. 1 is a diagram of an architecture of an audio control system to which an embodiment of this application is applicable.

The audio control method provided in embodiments of this application is applied to a scenario in which an audio device is connected to a plurality of electronic devices. The electronic device may provide audio data. The audio device receives the audio data sent by the electronic device and plays the audio data. For example, FIG. 1 is a diagram of an architecture of an audio control system to which an embodiment of this application is applicable. As shown in FIG. 1, in an audio control system, electronic devices include a mobile phone 1 and a mobile phone 2, and audio devices include a Bluetooth headset 3 and a Bluetooth sound box 4. The Bluetooth headset 3 is connected to both the mobile phone 1 and the mobile phone 2, and the Bluetooth sound box 4 is connected to both the mobile phone 1 and the mobile phone 2. The mobile phone 1 is used as an example. An audio service of the mobile phone 1 may be played by using the local device, or played by using the Bluetooth headset 3, or played by using the Bluetooth sound box 4. When the audio service of the mobile phone 1 is concurrent with an audio service of the mobile phone 2, for example, both of the audio services are expected to be played by using the Bluetooth headset 3, a service conflict occurs on a Bluetooth headset side, and service arbitration between the mobile phone 1 and the mobile phone 2 and preemption of the audio device are involved.

Optionally, the plurality of electronic devices may be connected to each other, or may not be connected to each other.

Optionally, a connection between the electronic device and the audio device may be a Bluetooth connection, or may be another type of communication connection. This is not limited in embodiments of this application. For ease of description, the Bluetooth connection is used as an example in this embodiment of this application.

Names, types, and quantities of electronic devices and audio devices in the audio control system are not limited in embodiments of this application. For example, the electronic device is also referred to as an audio play device, an audio source device, or a central device. Some examples of the electronic device include devices such as a mobile phone, a media player (for example, an MP3 or an MP4), a tablet computer, a notebook computer, an ultra-mobile personal computer (ultra-mobile personal computer, UMPC), a personal digital assistant (personal digital assistant, PDA), a smart screen, a television, or a smart watch. For example, the audio device is also referred to as an audio peripheral. Some examples of the audio device include a Bluetooth headset, a Bluetooth sound box, a wireless band, a wireless watch, a wireless vehicle-mounted device, an augmented reality (augmented reality, AR) device, a virtual reality (virtual reality, VR) device, and the like.

For ease of description, in this embodiment of this application, an example in which there are two electronic devices: the mobile phone 1 and the mobile phone 2, and the audio device is a Bluetooth headset is used.

First, concepts in embodiments of this application are described.

1. Audio Service, Media Audio Service, Call Audio Service, and Audio Stream (Audio Data)

A service that is initiated by an electronic device and that needs to play a sound is referred to as an audio service.

The audio service may be classified, and a classification principle is not limited in embodiments of this application. For example, classification may be performed based on real-time performance and playing content of the audio service. Optionally, the audio service may include but is not limited to a media audio service and a call audio service. The media audio service includes but is not limited to playing music, a prompt tone, a navigation tone, an alarm clock, a game, a video, and the like. The call audio service may include but is not limited to playing a voice call or a video call. Optionally, the media audio service and the call audio service may be further classified in detail. For example, the media audio service includes a first media audio service and a second media audio service; the first media audio service includes playing music, a prompt tone, a navigation tone, and an alarm clock; and the second media audio service includes playing a game and a video.

Data of the audio service may be referred to as an audio stream or audio data. Data of the media audio service may be referred to as a media audio stream or media audio data, and data of the call audio service may be referred to as a call audio stream or call audio data.

2. Priority of the Audio Service

Each type of audio service corresponds to a priority. For example, a priority of the call audio service is higher than a priority of the media audio service. A priority of the second media audio service is higher than a priority of the first media audio service. Priorities of different types of audio services are not limited in embodiments of this application. The electronic device and/or the audio device may store a preset correspondence between a priority and a type of an audio service.

Optionally, the electronic device presets the preset correspondence between the priority and the type of the audio service.

Optionally, a user may set the preset correspondence between the priority and the type of the audio service on a related interface displayed by the electronic device or the audio device. Content and a layout of the related interface are not limited in embodiments of this application, and a setting operation of the user is not limited in embodiments of this application. Optionally, the setting operation may include but is not limited to at least one of the following: adding, deleting, or modifying a correspondence between a priority and a type.

Optionally, the electronic device or the audio device may respond to a preset operation of the user, to display the preset correspondence between the priority and the type of the audio service to the user. The preset operation is not limited in embodiments of this application. For example, the preset operation includes but is not limited to a touch control operation, a voice control operation, or the like.

3. Priority of a Sound-Emitting Channel of the Electronic Device

The electronic device may emit a sound by using the local device, for example, emit a sound by using a speaker, a loudspeaker, or an earpiece of the local device. After being connected to the audio device, the electronic device may further emit a sound through the audio device. When the electronic device has a plurality of sound-emitting channels, each sound-emitting channel corresponds to a priority. For example, the electronic device is connected to a Bluetooth headset and a Bluetooth sound box. A priority of the Bluetooth headset is higher than a priority of the Bluetooth sound box, and the priority of the Bluetooth sound box is higher than a priority of the local device. Priorities of different sound-emitting channels are not limited in embodiments of this application.

Optionally, the user may set the priority of the sound-emitting channel of the electronic device on a related interface of the electronic device. Content and a layout of the related interface are not limited in embodiments of this application, and a setting operation of the user is not limited in embodiments of this application.

Optionally, in a scenario of preempting an audio device, an electronic device of a preempted party may switch from a high-priority sound-emitting channel to a low-priority sound-emitting channel based on priorities of sound-emitting channels.

p 4. Status of the Electronic Device and Status of the Audio Device

After being connected to the audio device, the electronic device may be in a service state or a non-service state. The service state means that the electronic device initiates an audio service and is performing the audio service on the audio device. The non-service state means that the electronic device does not perform an audio service on the audio device. The non-service state includes the following: The electronic device does not initiate an audio service, or the electronic device initiates an audio service but does not perform the audio service on the audio device. For example, the electronic device plays music on the local device, or the electronic device plays music by using a Bluetooth headset and then suspends playing the music.

The status of the audio device may alternatively be referred to as a playing status of the audio device, and includes an idle state and a play state. The idle state means that the audio device currently does not perform an audio service of any electronic device. The play state means that the audio device currently performs an audio service of the electronic device in the service state.

5. Status Notification Message

The status notification message is sent by the audio device to the electronic device, and indicates a status of the audio device. The status notification message is sent, so that the electronic device accurately senses the playing status of the audio device. This facilitates proper determining of the electronic device in an audio device preemption scenario, and improves properness of preempting the audio device by the electronic device.

Optionally, if the status of the audio device is the idle state, the status notification message indicates that the status of the audio device is the idle state. Specific content of the status notification message is not limited in embodiments of this application. For example, the status notification message may include 1-bit information, and a value of the 1-bit information is a preset value. Optionally, the preset value is 0 or 1.

Optionally, if the status of the audio device is the play state, the status notification message may include a service type of a current audio service of the audio device and device information of an electronic device initiating the current audio service. Device information is used to distinguish between different electronic devices. For example, the device information may reflect at least one of the following: a name or a type of an electronic device.

An implementation in which the audio device sends the status notification message is not limited in embodiments of this application. Optionally, the status notification message may be sent through an echo (echo) channel of the logical link control and adaptation protocol (logical link control and adaptation layer protocol, L2CAP). Optionally, the status notification message may be sent by using an AT command through an AT channel. The AT is an upper-layer protocol based on the L2CAP in the Bluetooth protocol.

A name of the status notification message is not limited in embodiments of this application. For example, the status notification message may also be referred to as an audio peripheral status notification message (NTF).

6. Notification Information

The notification information is information displayed on the electronic device, and indicates a status of the audio device. Status information is displayed, so that the user accurately senses the playing status of the audio device. This helps the user perform a proper operation in an audio device preemption scenario, thereby improving properness of preempting the audio device. A display manner of the notification message is not limited in embodiments of this application. For example, the display manners include but are not limited to the following: popping up a display box on a current interface of the electronic device, where the display box includes the notification information; displaying the notification information in a status bar of the electronic device; displaying the notification information on a top of a screen of the electronic device in a floating manner; and displaying the notification information in a preset interface of the electronic device. Layouts of the display box and the preset interface are not limited in embodiments of this application, a manner of entering the preset interface is not limited in embodiments of this application, and specific content of the notification information is not limited in embodiments of this application. For example, the preset interface may be an audio switching interface in the following FIG. 2(*a*) to FIG. 2(*c*), and the manner of entering the preset interface may be that the user slides down a notification bar interface, to switch the notification bar interface to the audio switching interface. For ease of description, an example in which the notification information is displayed on the audio switching interface is used in embodiments of this application.

Optionally, if the status of the audio device is the idle state, the notification information indicates that the status of the audio device is the idle state.

Optionally, if the status of the audio device is the play state, the notification information indicates a service type of a current audio service of the audio device and an electronic device initiating the current audio service.

7. First Message

The first message is sent by the electronic device to the audio device, and is used to request the audio device to perform a target audio service of the electronic device.

Optionally, in an implementation, the electronic device stores priorities of different audio services, and the electronic device determines whether the electronic device can preempt the audio device. When determining that the electronic device can preempt the audio device to perform the target audio service, the electronic device sends the first message. For details, refer to embodiments shown in FIG. 8 to FIG. 10.

Optionally, in another implementation, the audio device stores priorities of different audio services. When expecting to preempt the audio device, the electronic device sends the first message. Subsequently, the audio device determines whether the electronic device can preempt the audio device. For details, refer to embodiments shown in FIG. 11 to FIG. 13.

An implementation in which the electronic device sends the first message is not limited in embodiments of this application. Optionally, the first message may be sent through an echo channel of the L2CAP. Optionally, the first message may be sent by using an AT command.

A name of the first message is not limited in embodiments of this application. For example, the first message may also be referred to as a service preemption request message (REQ).

8. Bluetooth Connection

In embodiments of this application, the electronic device and the audio device perform the Bluetooth connection based on a Bluetooth protocol.

To implement interconnection and interworking between different devices on different platforms, in terms of a Bluetooth audio transmission protocol, corresponding specifications are formulated for various possible universal application scenarios, for example, an advanced audio distribution profile (advanced audio distribution profile, A2DP) and a hands-free profile (hands-free profile, HFP).

9. A2DP Connection and Asynchronous Connection-Oriented (Asynchronous Connection-Oriented, ACL) Link The A2DP profile is a high-quality audio protocol running on the ACL link. The A2DP profile defines a protocol and a process for transmitting high-quality audio data, for example, mono or stereo audio, through the ACL link. A connection between devices based on the A2DP profile is referred to as an A2DP service profile connection, which is referred to as an A2DP connection for short.

The ACL link is also referred to as an ACL connection. A data packet may be sent in a directional manner through the ACL link. The ACL link supports both symmetric and asymmetric connections.

The ACL connection is a connection at a physical layer in the Bluetooth protocol, and the A2DP connection is a connection at an application layer in the Bluetooth protocol. For the Bluetooth connection between the electronic device and the audio device, the A2DP connection may be established immediately after the ACL connection is established, or the A2DP connection is established after the ACL connection is established and when the electronic device performs a media audio service.

Optionally, in an implementation, the audio device may maintain an A2DP connection to the electronic device in the non-service state. In this way, a process of frequently establishing an A2DP connection between the audio device and the electronic device is avoided.

Optionally, in another implementation, the audio device may disconnect the A2DP connection between the audio device and the electronic device in the non-service state. The A2DP connection is disconnected, to avoid occupation of invalid resources.

10. HFP Connection and Synchronous Connection-Oriented (Synchronous Connection-Oriented, SCO) Link An HFP profile mainly defines implementation of some functions related to call answering/making. A connection between devices based on the HFP profile is referred to as an HFP service profile connection, which is referred to as an HFP connection for short. The electronic device may send a call audio stream to the audio device based on the HFP connection through an SCO link.

The SCO link is also referred to as an SCO connection, and a data packet may be transmitted by using a reserved timeslot through the SCO link. The SCO connection is a symmetric connection. An SCO data packet can transmit both voice and data. The SCO packet is mainly used to transmit communication data with a high time requirement. In addition, an extended SCO (extended SCO, eSCO) link may also be used to transmit communication data with a high time requirement.

The SCO connection is a connection at a physical layer in the Bluetooth protocol, and the HFP connection is a connection at an application layer in the Bluetooth protocol. For the Bluetooth connection between the electronic device and the audio device, the SCO connection and the HFP connection may be established immediately after the ACL connection is established, or the SCO connection and the HFP connection are established after the ACL connection is established and when the electronic device performs a call audio service.

Optionally, in an implementation, the audio device may maintain an HFP connection to the electronic device in the non-service state. In this way, a process of frequently establishing an HFP connection between the audio device and the electronic device is avoided.

Optionally, in another implementation, the audio device may disconnect the HFP connection between the audio device and the electronic device in the non-service state. The HFP connection is disconnected, to avoid occupation of invalid resources.

Figure 2A:
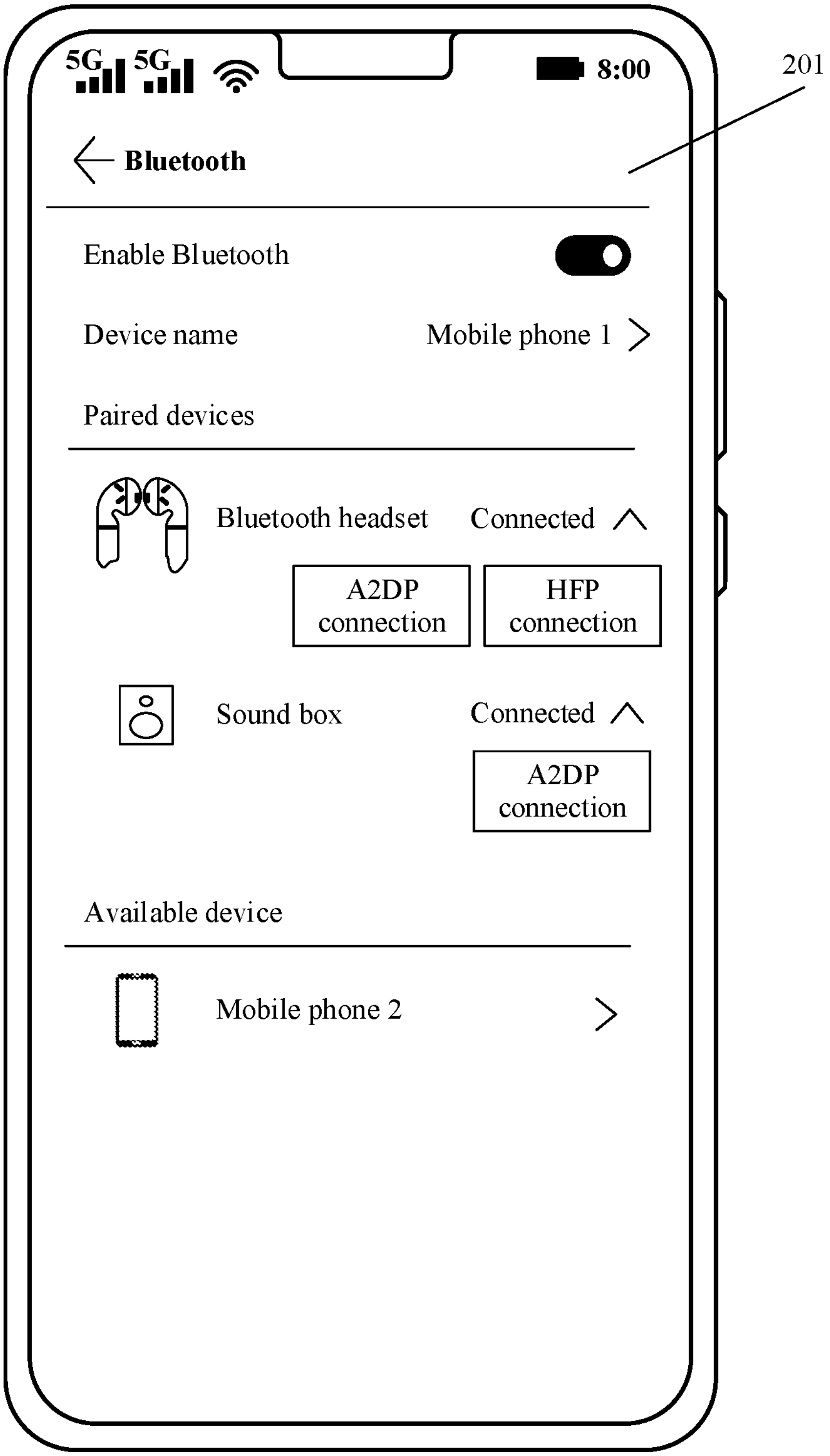
FIG. 2(*a*) to FIG. 2(*c*) are a schematic diagram of an interface when an audio device is connected to an electronic device.
Figure 2B:
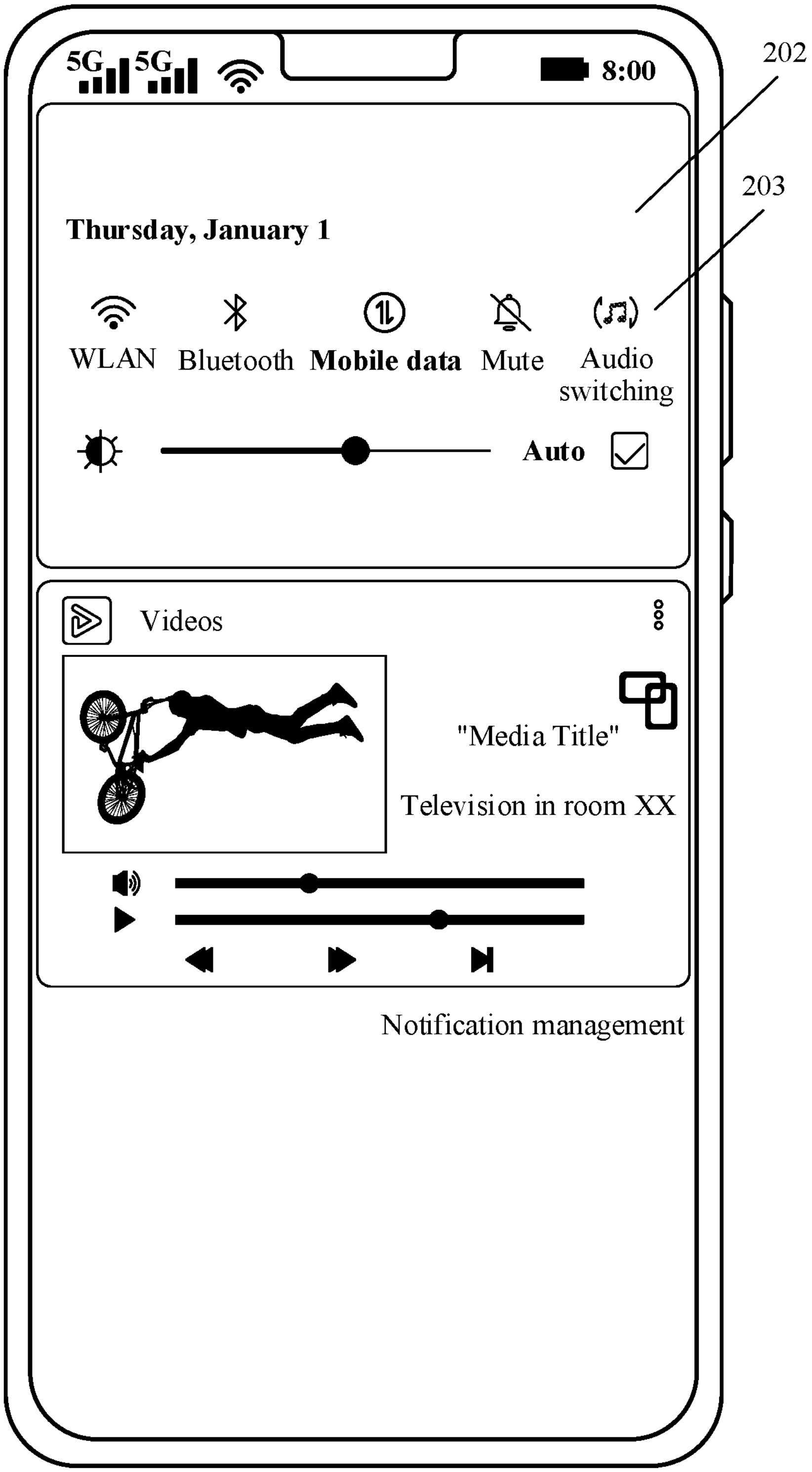
Figure 2C:
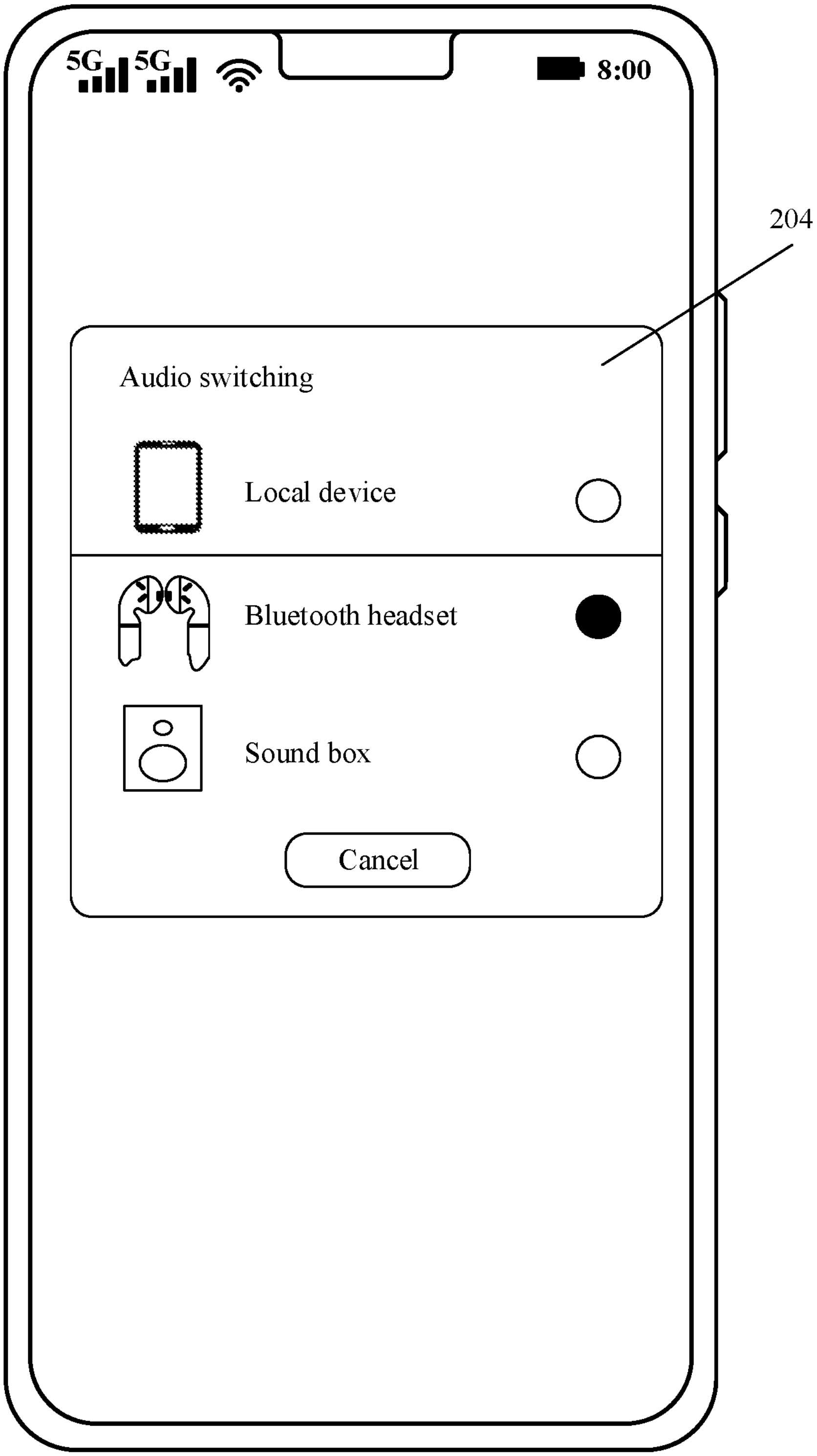

The following describes, with reference to FIG. 2(*a*) to FIG. 2(*c*), a related interface currently used when an audio device is connected to an electronic device. However, FIG. 2(*a*) to FIG. 2(*c*) constitute no limitation on the related interface.

FIG. 2(*a*) shows a Bluetooth setting interface 201 of an electronic device. As shown in FIG. 2(*a*), a mobile phone 1 has enabled a Bluetooth function. The mobile phone 1 is paired and connected to a Bluetooth headset, to establish an A2DP connection and an HFP connection. The mobile phone 1 is further paired and connected to a sound box, to establish an A2DP connection.

FIG. 2(*b*) is a schematic diagram of a sliding notification bar interface of the electronic device. As shown in FIG. 2(*b*), an "Audio switching" control 203 is displayed on the sliding notification bar interface 202. When the electronic device receives an operation of a user on the "Audio switching" control 203, as shown in FIG. 2(*c*), the electronic device may display an audio switching interface 204. The audio switching interface 204 may include sound-emitting channel options of the electronic device. For example, the audio switching interface 204 may include a "Local device" option, a "Bluetooth headset" option, and a "Sound box" option. The electronic device may receive an operation of the user on a sound-emitting channel option, and switch between different audio output manners. For example, it is assumed that the electronic device currently emits a sound by using the local device. When the user taps the "Bluetooth headset" option, in response to an operation of the user, the electronic device switches from a local sound-emitting channel to a Bluetooth headset sound-emitting channel, to output a sound by using the Bluetooth headset.

It can be learned that the user may know a current sound-emitting channel of the electronic device based on the audio switching interface.

Optionally, a sound-emitting channel used each time the electronic device initiates an audio service may be preset. For example, when the electronic device establishes a Bluetooth connection to the Bluetooth headset, the Bluetooth headset is used as a sound-emitting channel of the electronic device by default.

For ease of description, in this embodiment of this application, an example in which both the mobile phone 1 and a mobile phone 2 are set to emit a sound by using the Bluetooth headset by default when an audio service is initiated is used to describe how to process a case in which audio services of a plurality of electronic devices are concurrent in this embodiment of this application.

Currently, when the Bluetooth headset is connected to two mobile phones, the Bluetooth headset follows different preemption policies in different cases.

(1) First Initiation and First Use

If the Bluetooth headset currently does not process an audio service, that is, the Bluetooth headset is in an idle state, the Bluetooth headset may output an audio stream transmitted by either of the two mobile phones, and follow a preemption policy of "first initiation and first use".

For example, the Bluetooth headset is in the idle state. When the mobile phone 1 first initiates a media audio service, the mobile phone 1 plays music by using the Bluetooth headset, and an audio service of the mobile phone 2 cannot be played by using the Bluetooth headset. After the media audio service of the mobile phone 1 ends, the audio service of the mobile phone 2 may be played by using the Bluetooth headset. If the mobile phone 2 initiates a call when the mobile phone 1 is playing music, the mobile phone 2 cannot preempt the Bluetooth headset.

(2) User Manual Preemption

In this preemption policy, the Bluetooth headset first processes an audio service of an electronic device selected by a user.

For example, the Bluetooth headset is processing a media audio service initiated by the mobile phone 1. If the mobile phone 2 receives an operation of selecting the Bluetooth headset as a sound-emitting device by the user, the mobile phone 2 initiates a media audio service. In this case, the Bluetooth headset first processes the media audio service initiated by the mobile phone 2, and stops processing the media audio service initiated by the mobile phone 1. In this case, the mobile phone 1 may output a sound by using the local device or another audio device.

For another example, the Bluetooth headset is processing the media audio service initiated by the mobile phone 1, and the mobile phone 2 does not initiate an audio service. If the mobile phone 2 receives an operation of selecting the Bluetooth headset as a sound-emitting device by the user, the Bluetooth headset is preempted by the mobile phone 2, and stops processing the media audio service initiated by the mobile phone 1. In this case, the mobile phone 1 may output a sound by using the local device or another audio device. Although the mobile phone 2 preempts the Bluetooth headset, the Bluetooth headset is in an idle state because the mobile phone 2 does not initiate an audio service.

For another example, the Bluetooth headset is processing a call audio service initiated by the mobile phone 1. If the mobile phone 2 receives an operation of selecting the Bluetooth headset as a sound-emitting device by the user, the mobile phone 2 initiates a media audio service. In this case, the Bluetooth headset first processes the media audio service initiated by the mobile phone 2, and stops processing the call audio service initiated by the mobile phone 1. In this case, the call audio service of the mobile phone 1 may be suspended, or a sound may be output by using the local device or another audio device. In this scenario, a high-priority service may be suspended or interrupted.

It can be learned that in a current implementation, the user may learn a current sound-emitting channel of the electronic device based on an audio switching interface displayed by the electronic device. In a current preemption policy, a high-priority service may be suspended or interrupted, or cannot preempt use of an audio device, or a Bluetooth headset may be idle. This cannot meet an actual use requirement of an audio service, and user experience is very poor.

An embodiment of this application provides an audio control method. An audio device may notify an electronic device connected to the audio device of a current status of the audio device. In this way, each electronic device connected to the audio device accurately learns the status of the audio device, for example, whether the audio device is in an idle state or a play state. The electronic device may notify the user of the status of the audio device. This helps the user properly and manually preempt the audio device, thereby meeting an actual use requirement of an audio service. When the electronic device initiates a target audio service and needs to preempt the audio device, the electronic device or the audio device may determine, based on a status of the audio device and a priority of the target audio service, whether the electronic device is allowed to preempt the audio device. This improves properness of preempting the audio device, meets an actual use requirement of an audio service, and improves user experience.

The following describes, by using FIG. 3A to FIG. 3G, an example of an application scenario to which embodiments of this application are applicable. However, FIG. 3A to FIG. 3G constitute no limitation on the application scenario.

Figure 3A:
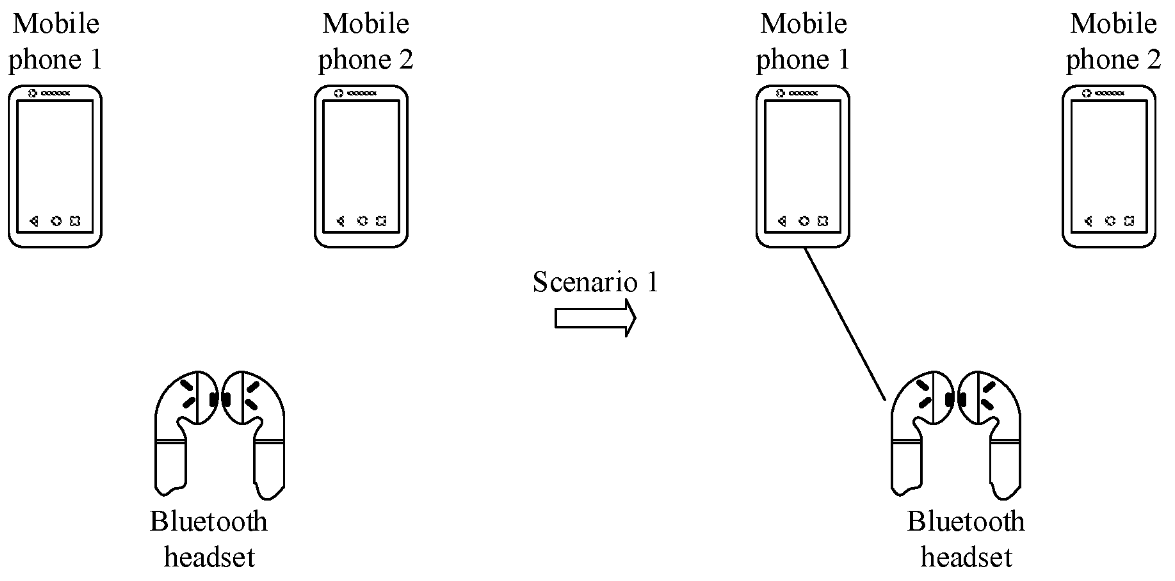
FIG. 3A to FIG. 3G are a group of schematic diagrams of application scenarios according to an embodiment of this application.

Optionally, in Scenario 1, an electronic device initially establishes a Bluetooth connection to an audio device. As shown in FIG. 3A, an audio control system includes a mobile phone 1, a mobile phone 2, and a Bluetooth headset. Neither the mobile phone 1 nor the mobile phone 2 is connected to the Bluetooth headset. Then, the mobile phone 1 establishes a Bluetooth connection to the Bluetooth headset.

Figure 3B:
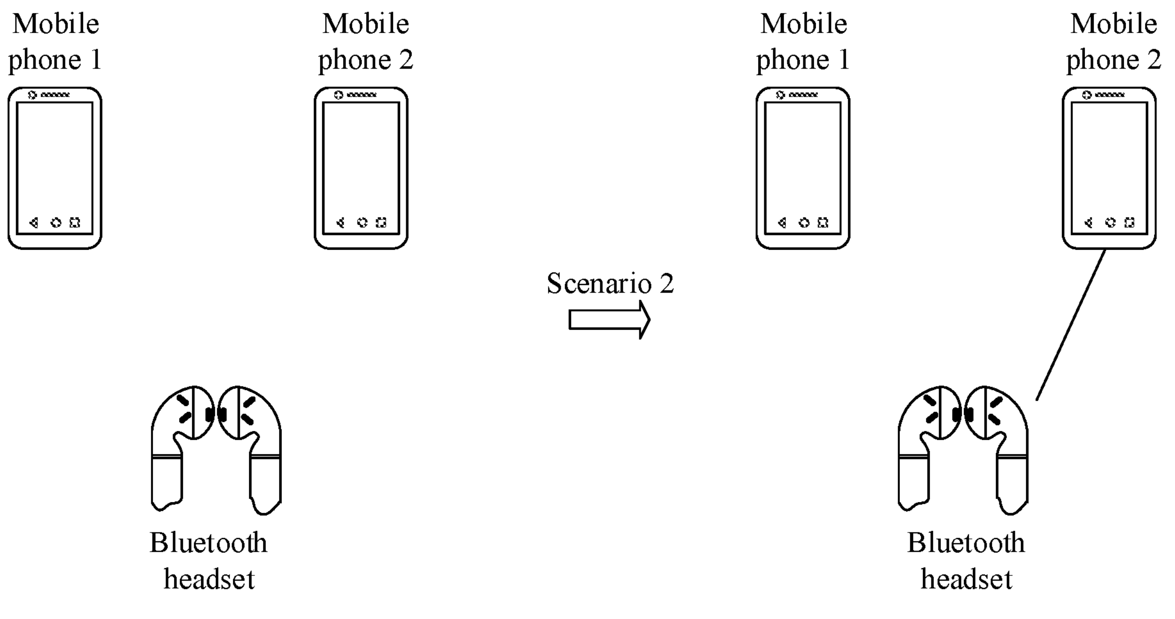

Optionally, in Scenario 2, the electronic device initially establishes a Bluetooth connection to the audio device. As shown in FIG. 3B, a difference between Scenario 2 and Scenario 1 lies in the following: The mobile phone 2 initially establishes a Bluetooth connection to the Bluetooth headset.

Figure 3C:
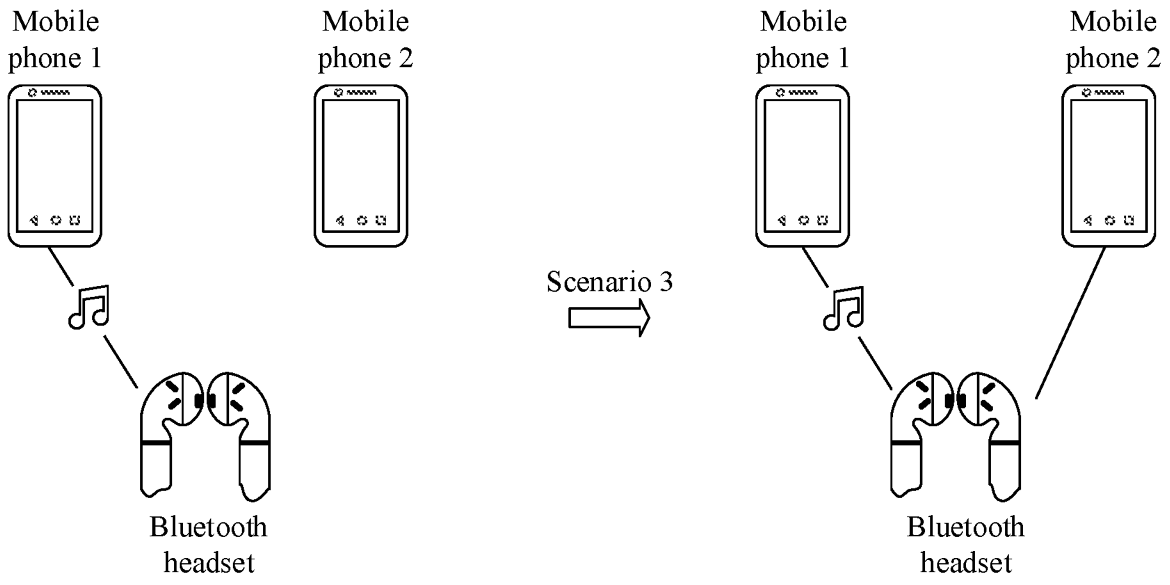

Optionally, in Scenario 3, the electronic device initially establishes a Bluetooth connection to the audio device. As shown in FIG. 3C, the mobile phone 1 is connected to the Bluetooth headset, and the Bluetooth headset processes a media audio service of the mobile phone 1, for example, playing music. The mobile phone 2 is not connected to the Bluetooth headset. Then, the mobile phone 2 establishes a Bluetooth connection to the Bluetooth headset. A difference between Scenario 3 and Scenario 1 and Scenario 2 lies in the following: The Bluetooth headset is in a different state.

Figure 3D:
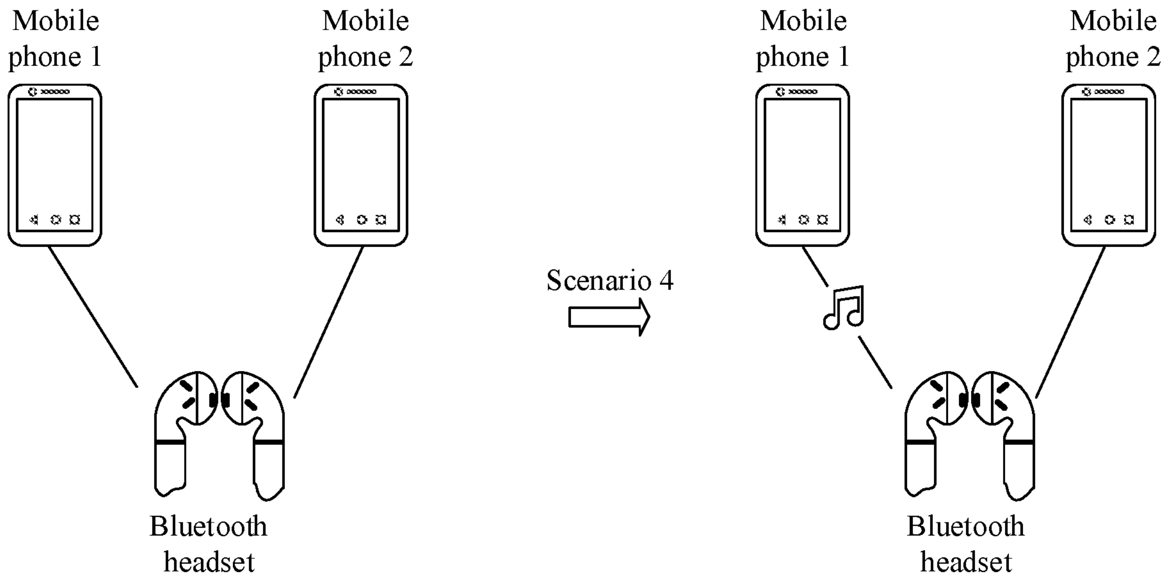

Optionally, in Scenario 4, the electronic device is connected to the audio device, and the audio device is in an idle state. It may be understood as the following: The electronic device preempts the audio device in the idle state. As shown in FIG. 3D, both the mobile phone 1 and the mobile phone 2 are connected to the Bluetooth headset, and the Bluetooth headset is in an idle state. Then, the mobile phone 1 initiates a media audio service, and preempts the Bluetooth headset in the idle state. Correspondingly, the Bluetooth headset processes the media audio service of the mobile phone 1, for example, playing music.

Figure 3E:
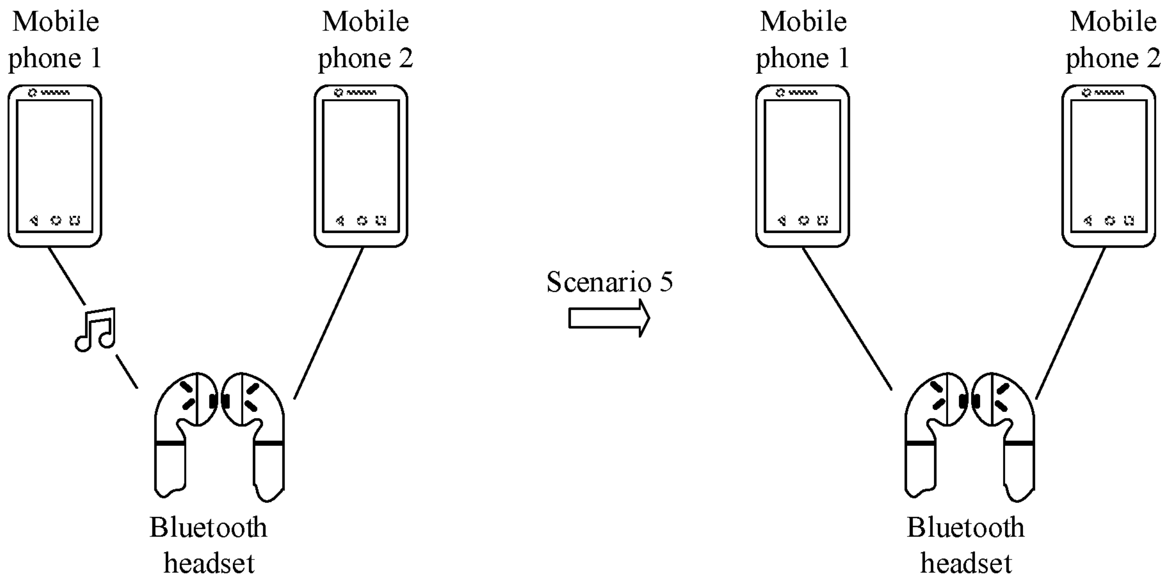

Optionally, in Scenario 5, the electronic device is connected to the audio device, and the audio device is in a play state. As shown in FIG. 3E, both the mobile phone 1 and the mobile phone 2 are connected to the Bluetooth headset, and the Bluetooth headset processes the media audio service of the mobile phone 1, for example, playing music. Then, the mobile phone 1 ends the media audio service, and the Bluetooth headset changes from the play state to the idle state.

Figure 3F:
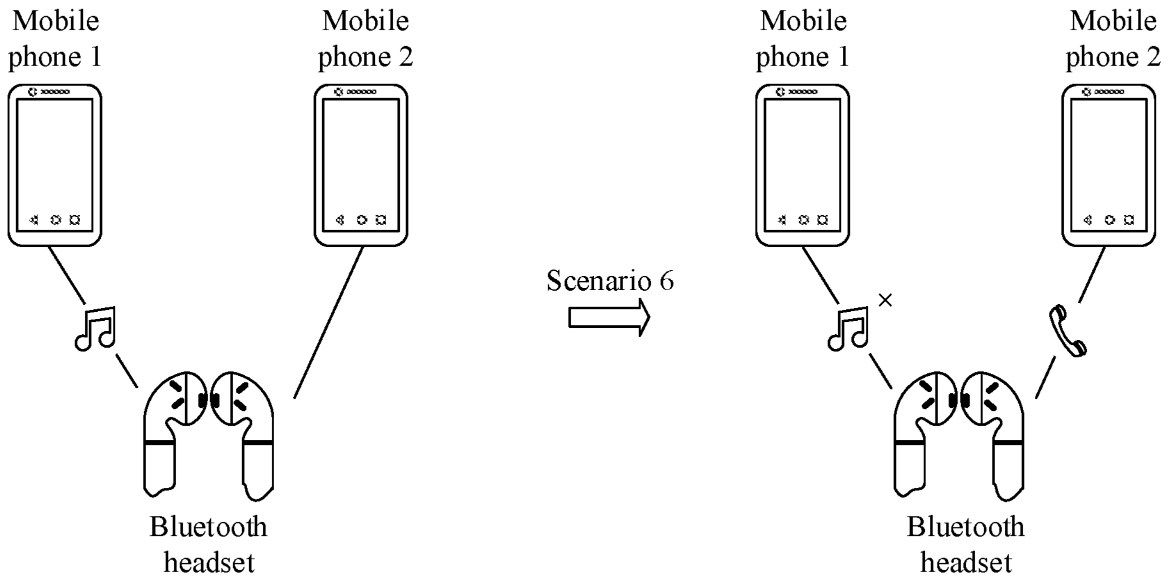

Optionally, in Scenario 6, the electronic device is connected to the audio device. Scenario 6 is a scenario in which a high-priority service preempts use of the audio device. As shown in FIG. 3F, both the mobile phone 1 and the mobile phone 2 are connected to the Bluetooth headset, and the Bluetooth headset processes the media audio service of the mobile phone 1, for example, playing music. Then, the mobile phone 2 initiates a call audio service, and the mobile phone 2 preempts the Bluetooth headset in the play state. The Bluetooth headset stops processing the media audio service of the mobile phone 1, and processes the call audio service of the mobile phone 2. In this scenario, a high-priority service smoothly preempts the audio device, thereby meeting an actual use requirement of an audio service.

Figure 3G:
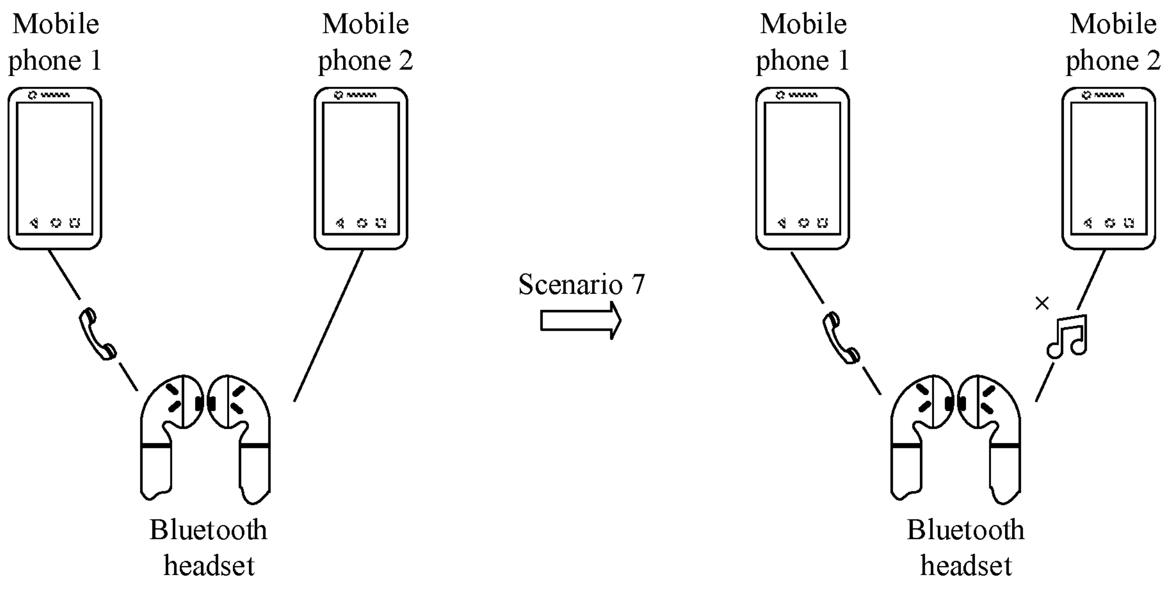

Optionally, in Scenario 7, the electronic device is connected to the audio device. Scenario 7 is a scenario in which a low-priority service preempts use of the audio device. As shown in FIG. 3G, both the mobile phone 1 and the mobile phone 2 are connected to the Bluetooth headset, and the Bluetooth headset processes the call audio service of the mobile phone 1. Then, the mobile phone 2 initiates a media audio service, for example, playing music. The mobile phone 2 cannot preempt the Bluetooth headset in the play state. The Bluetooth headset is always processing the call audio service of the mobile phone 1. In this scenario, a low-priority service cannot preempt use of the audio device by a high-priority service, thereby meeting an actual use requirement of an audio service.

The following describes the technical solutions of this application in detail with reference to specific embodiments. The following embodiments may be combined with each other, and a same or similar concept or process may not be described again in some embodiments.

The terms "first", "second", "third", "fourth", and the like (if any) in embodiments of this application are intended to distinguish between similar objects but do not necessarily indicate a specific order or sequence.

In descriptions of embodiments of this application, "/" indicates "or", unless otherwise specified. For example, A/B may indicate A or B. The term "and/or" in this specification describes only an association relationship between associated objects, and indicates that three relationships may exist. For example, A and/or B may indicate the following three cases: Only A exists, both A and B exist, and only B exists.

In the descriptions of embodiments of this application, unless otherwise specified, "a plurality of" means two or more.

In embodiments of this application, in a scenario in which service concurrency causes audio device preemption, an electronic device of a preempted party or an electronic device that fails in preemption may perform at least one of the following operations: switching a current sound-emitting channel to another sound-emitting channel, for example, a local sound-emitting channel or a sound box in a Bluetooth connected state, where a switching sequence may be specifically determined based on preset priorities of sound-emitting channels; displaying a pop-up box to indicate that a current sound-emitting channel is switched to another sound-emitting channel, or displaying a pop-up box to indicate whether to switch a current sound-emitting channel to another sound-emitting channel; stopping or suspending playing of a current audio service; muting a current audio service; and decreasing a sound volume of a current audio service.

It should be noted that sequence numbers of the steps do not mean execution sequences in embodiments of this application. The execution sequences of the steps should be determined based on functions and internal logic of the processes, and should not be construed as any limitation on the implementation processes of embodiments of this application.

Figure 4:
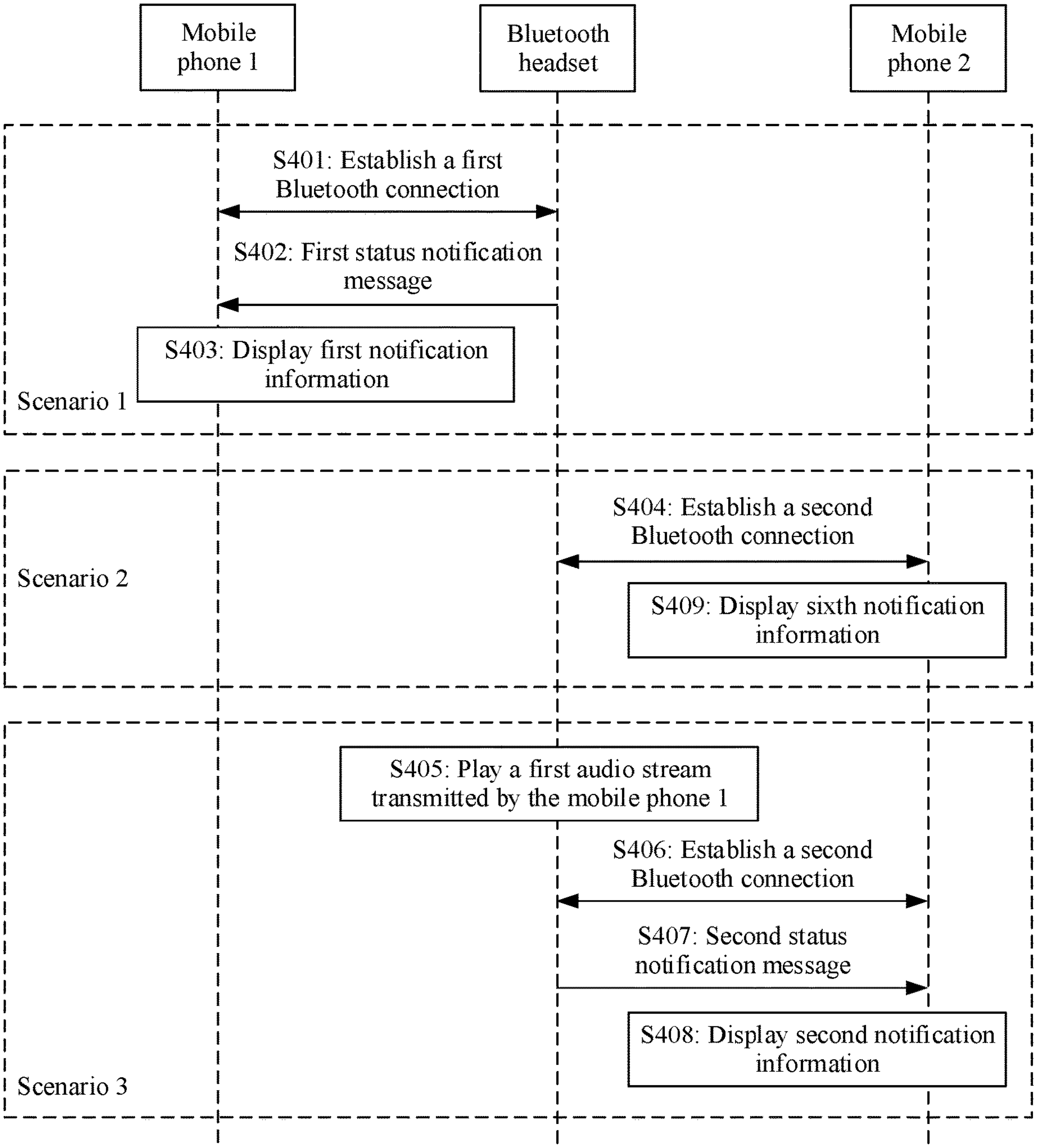
FIG. 4 is a flowchart of an audio control method according to an embodiment of this application.
Figure 5:
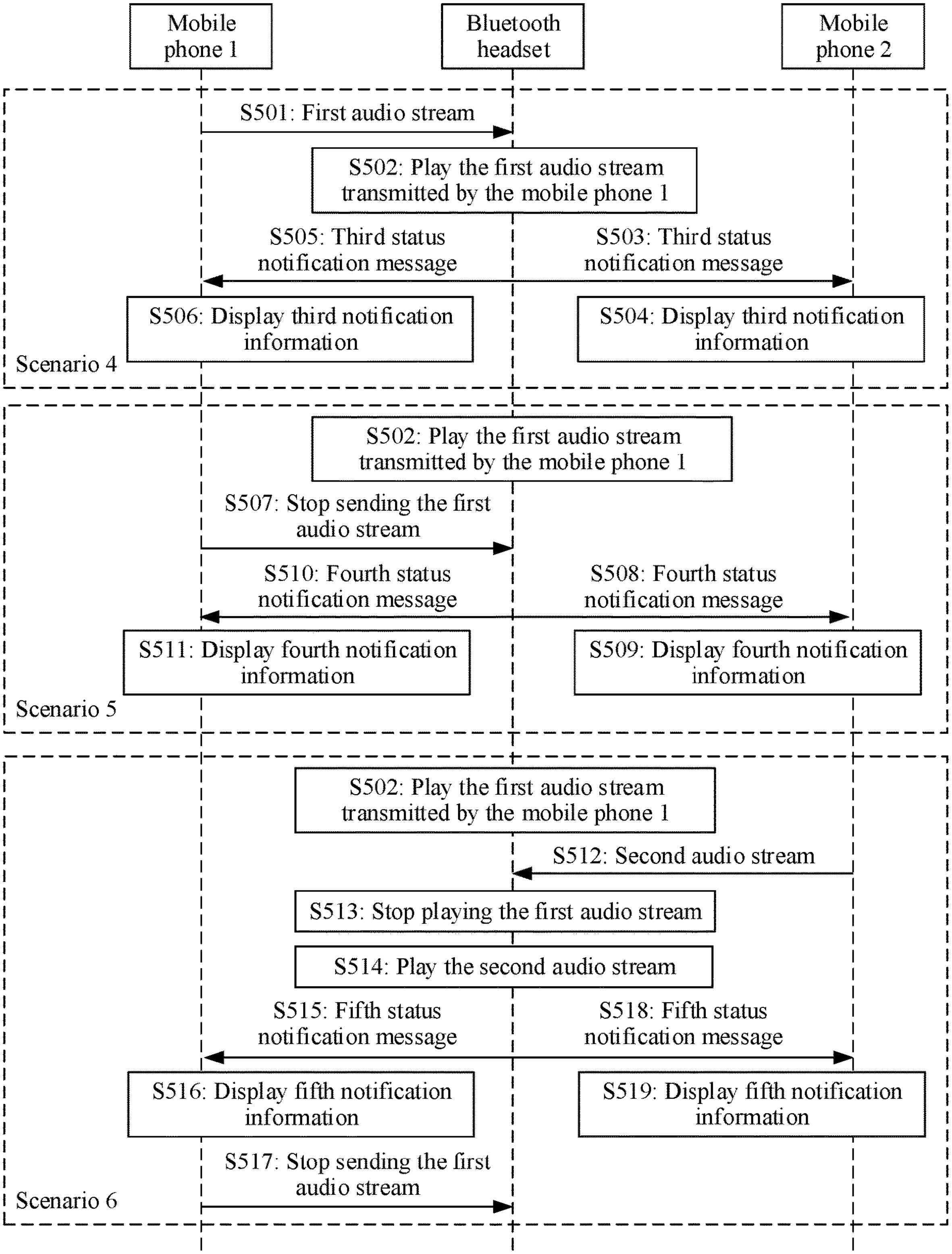
FIG. 5 is another flowchart of an audio control method according to an embodiment of this application.

FIG. 4 is a flowchart of an audio control method according to an embodiment of this application, and FIG. 5 is another flowchart of an audio control method according to an embodiment of this application. The audio control method provided in this embodiment is performed by an electronic device and an audio device. For example, the electronic devices include a mobile phone 1 and a mobile phone 2, and the audio devices is a Bluetooth headset. This embodiment relates to a process in which the audio device notifies the electronic device of a current playing status. The electronic device may learn an accurate status of the Bluetooth headset and display the accurate status of the Bluetooth headset to a user, so that the user learns the accurate status of the Bluetooth headset. This helps the user subsequently properly performs an operation of preempting the audio device, meets an actual use requirement of an audio service, and improves use experience.

The following provides descriptions with reference to different application scenarios. To distinguish between a status notification message sent by the Bluetooth headset and notification information displayed by the mobile phone in different scenarios, the status notification messages are respectively referred to as a first status notification message to a fifth status notification message, and the notification information is respectively referred to as first notification information to sixth notification information.

Optionally, in a first-type application scenario, the electronic device initially establishes a Bluetooth connection to the audio device. For ease of description, a Bluetooth connection between the Bluetooth headset and the mobile phone 1 is referred to as a first Bluetooth connection, and a Bluetooth connection between the Bluetooth headset and the mobile phone 2 is referred to as a second Bluetooth connection.

Optionally, in a policy of the first-type application scenario, after the electronic device establishes the Bluetooth connection to the audio device, the audio device sends a status notification message to the electronic device, to notify the electronic device of a status of the audio device, so that the electronic device can notify the user of the status of the audio device. Optionally, the status of the audio device may be an idle state or a play state.

For example, in a specific scenario, as shown in Scenario 1 shown in FIG. 3A, the mobile phone 1 initially establishes the first Bluetooth connection to the Bluetooth headset. As shown in Scenario 1 in FIG. 4, the audio control method may include the following steps.

S401: A Bluetooth headset establishes a first Bluetooth connection to a mobile phone 1.

S402: The Bluetooth headset sends a first status notification message to the mobile phone 1, where the first status notification message indicates that a status of the Bluetooth headset is an idle state.

Correspondingly, the mobile phone 1 receives the first status notification message sent by the Bluetooth headset.

S403: The mobile phone 1 displays first notification information based on the first status notification message, where the first notification information indicates that the status of the Bluetooth headset is the idle state.

Figure 6A:
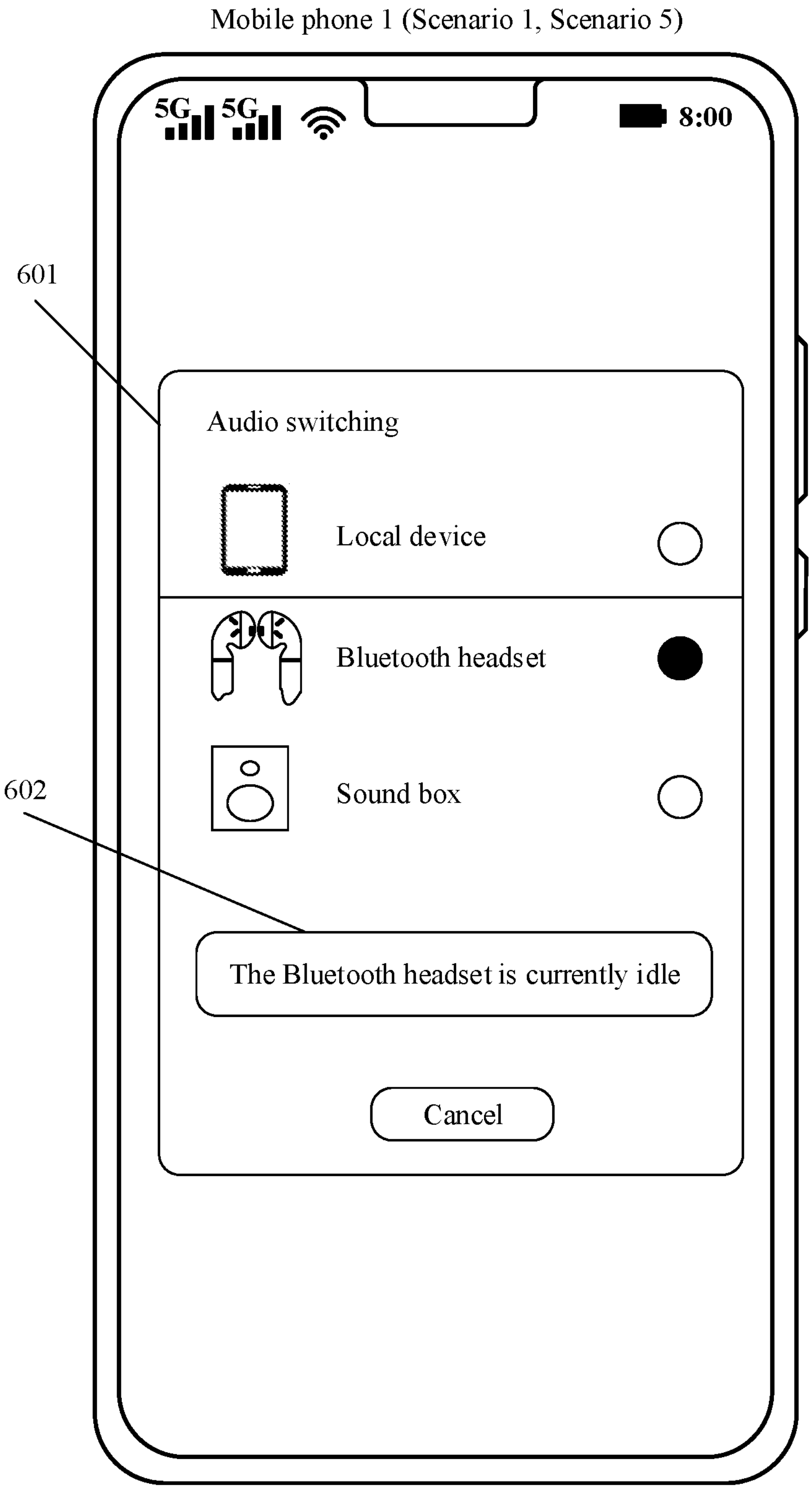
FIG. 6A to FIG. 6C are a group of schematic diagrams of an audio switching interface of a mobile phone 1 according to an embodiment of this application.

For example, FIG. 6A shows an audio switching interface 601 displayed by the mobile phone 1 in Scenario 1. As shown in FIG. 6A, the audio switching interface 601 includes first notification information 602. For example, the first notification information 602 is a text "The Bluetooth headset is currently idle".

For example, in another specific scenario, as shown in Scenario 3 shown in FIG. 3C, the Bluetooth headset currently processes a first audio service of the mobile phone 1, and the mobile phone 2 initially establishes a second Bluetooth connection to the Bluetooth headset. As shown in Scenario 3 in FIG. 4, the audio control method may include the following steps.

S405: The Bluetooth headset plays a first audio stream transmitted by the mobile phone 1.

A type of the first audio stream is not limited in this embodiment. For example, in Scenario 3, the first audio stream is a media audio stream.

S406: The Bluetooth headset establishes the second Bluetooth connection to the mobile phone 2.

S407: The Bluetooth headset sends a second status notification message to the mobile phone 2, where the second status notification message includes a service type of the first audio service and device information of the mobile phone 1.

Correspondingly, the mobile phone 2 receives the second status notification message sent by the Bluetooth headset.

S408: The mobile phone 2 displays second notification information based on the second status notification message, where the second notification information indicates the Bluetooth headset to process the first audio service of the mobile phone 1.

Figure 7A:
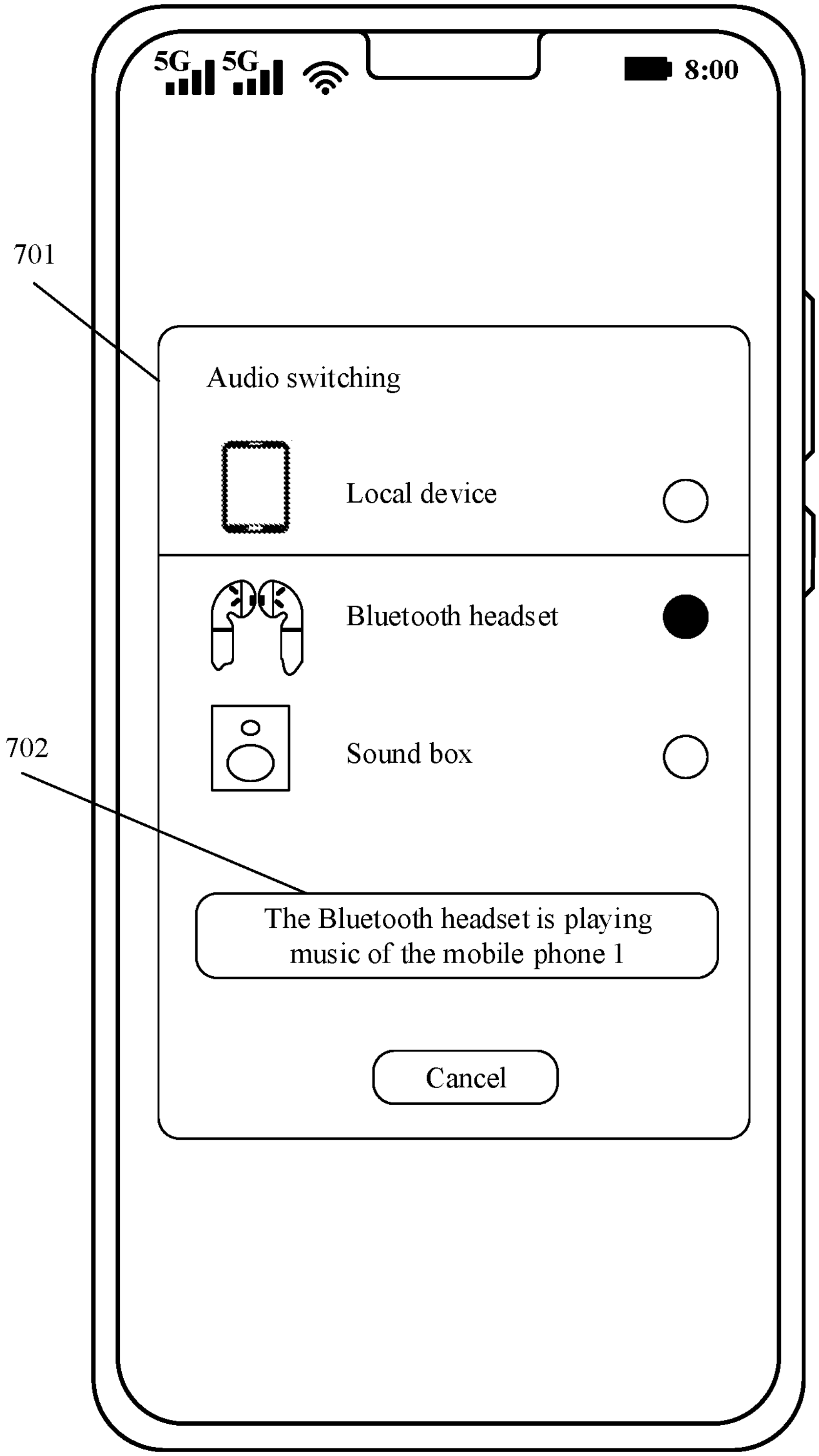
FIG. 7A to FIG. 7C are a group of schematic diagrams of an audio switching interface of a mobile phone 2 according to an embodiment of this application.

For example, FIG. 7A shows an audio switching interface 701 displayed by the mobile phone 2 in Scenario 3. As shown in FIG. 7A, the audio switching interface 701 includes second notification information 702. It is assumed that the first audio service is playing music. For example, the second notification information 702 is a text "The Bluetooth headset is playing music on the mobile phone 1".

Optionally, in another policy of the first-type application scenario, after the electronic device establishes the Bluetooth connection to the audio device, the electronic device considers by default that the status of the audio device is the idle state. If an actual status of the audio device is the idle state, the audio device may not send a status notification message to the electronic device, to reduce a quantity of messages exchanged between the electronic device and the audio device. Correspondingly, if the electronic device does not receive, within the preset duration, the status notification message sent by the audio device, the electronic device determines that the audio device is in the idle state. A value of the preset duration is not limited in this embodiment. If an actual status of the audio device is the play state, the audio device sends a status notification message to the electronic device. Therefore, the electronic device may notify the user of the actual status of the audio device.

For example, in a specific scenario, as shown in Scenario 2 shown in FIG. 3B, the mobile phone 2 initially establishes the second Bluetooth connection to the Bluetooth headset. As shown in Scenario 2 in FIG. 4, the audio control method may include the following steps.

S404: The Bluetooth headset establishes the second Bluetooth connection to the mobile phone 2.

It can be learned that after the mobile phone 2 initially establishes the Bluetooth connection to the Bluetooth headset, the Bluetooth headset is in the idle state by default. Because the actual status of the Bluetooth headset is the idle state, the Bluetooth headset does not need to send a status notification message to the mobile phone 2, and the mobile phone 2 can determine the accurate status of the Bluetooth headset.

Optionally, after S404, the method may further include the following step.

S409: The mobile phone 2 displays sixth notification information, where the sixth notification information indicates that the status of the Bluetooth headset is the idle state. Optionally, in a second-type application scenario, after initially establishing the Bluetooth connection to the audio device, the electronic device is in a phase of maintaining the Bluetooth connection. The maintaining the Bluetooth connection includes maintaining at least one of the following connections: an ACL connection, an SCO connection, an A2DP connection, or an HFP connection.

Optionally, in a policy of the second-type application scenario, if the status of the audio device changes, the audio device sends a status notification message to the electronic device, to notify the electronic device of the status of the audio device in a timely manner, so that the electronic device can notify the user of the status of the audio device in a timely manner. The electronic device includes an electronic device in a non-service state, that is, the audio device sends the status notification message to the electronic device in the non-service state. Optionally, the electronic device may further include an electronic device in a service state.

Optionally, that a status of the audio device changes may include any one of the following: The audio device changes from the idle state to the play state (Scenario 4 shown in FIG. 3D); the audio device changes from the play state to the idle state (Scenario 5 shown in FIG. 3E); the audio device processes an audio service of a same electronic device, but a type of the audio service changes; or the audio device performs an audio service of a different electronic device (Scenario 6 shown in FIG. 3F).

For example, in a specific scenario, as shown in Scenario 4 shown in FIG. 3D, the Bluetooth headset changes from the idle state to the play state, and the Bluetooth headset processes the first audio service of the mobile phone 1. As shown in Scenario 4 in FIG. 5, the audio control method may include the following steps.

S501: A mobile phone 1 (an electronic device in a service state) sends a first audio stream to a Bluetooth headset; and correspondingly, the Bluetooth headset receives the first audio stream sent by the mobile phone 1.

A type of the first audio stream is not limited in this embodiment. For example, in Scenario 4, the first audio stream is a media audio stream.

S502: The Bluetooth headset plays the first audio stream transmitted by the mobile phone 1.

S503: The Bluetooth headset sends a third status notification message to a mobile phone 2 (an electronic device in a non-service state), where the third status notification message includes a service type of the first audio service and device information of the mobile phone 1.

Correspondingly, the mobile phone 2 receives the third status notification message sent by the Bluetooth headset.

S504: The mobile phone 2 displays third notification information based on the third status notification message, where the third notification information indicates the Bluetooth headset to process the first audio service of the mobile phone 1.

For example, FIG. 7A shows an audio switching interface 701 displayed by the mobile phone 2 in Scenario 4. Refer to the foregoing descriptions. Details are not described herein again.

It can be learned that the status notification message is sent to the electronic device in the non-service state by using the Bluetooth headset, so that the electronic device in the non-service state and the user can be notified of the status of the Bluetooth headset. This helps subsequently improve properness of preempting the audio device by the electronic device in the non-service state or the user. For example, if a priority of an audio service initiated by the electronic device in the non-service state is higher than a priority of the first audio service, the electronic device in the non-service state may preempt the Bluetooth headset. If a priority of an audio service initiated by the electronic device in the non-service state is lower than a priority of the first audio service, the electronic device in the non-service state cannot preempt the Bluetooth headset, and may use a local sound-emitting channel or another low-priority sound-emitting channel.

A sequence of performing S501 to S502 and S503 is not limited in this embodiment.

Optionally, the audio control method may further include the following step.

S506: The mobile phone 1 (the electronic device in the service state) displays third notification information, where the third notification information indicates the Bluetooth headset to process the first audio service of the mobile phone 1.

Figure 6B:
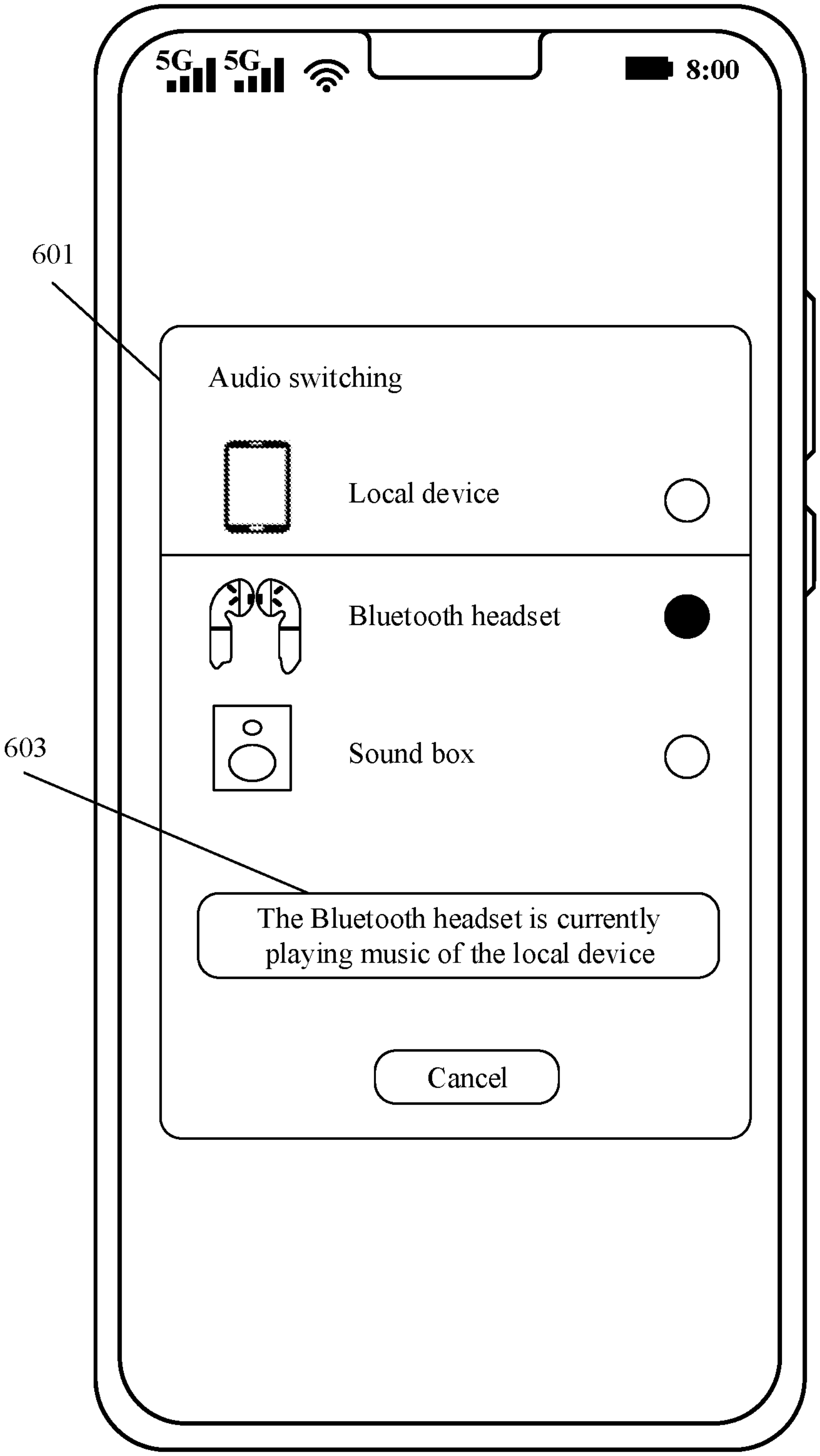

Specifically, the Bluetooth headset processes the first audio service of the mobile phone 1, and the mobile phone 1 may learn the status of the Bluetooth headset. The electronic device in the service state displays the third notification information, so that the user can be explicitly notified of the status of the Bluetooth headset, thereby improving use experience. For example, FIG. 6B shows an audio switching interface 601 displayed by the mobile phone 1 in Scenario 4. As shown in FIG. 6B, the audio switching interface 601 includes third notification information 603. It is assumed that the first audio service is playing music. For example, the third notification information 603 is a text "The Bluetooth headset currently plays music of the local device".

Optionally, before S506, the method may further include the following step.

S505: The Bluetooth headset sends the third status notification message to the mobile phone 1 (the electronic device in the service state); and correspondingly, the mobile phone 1 receives the third status notification message sent by the Bluetooth headset.

Specifically, the status notification message is sent to the electronic device in the service state by using the Bluetooth headset, so that the electronic device in the service state and the user may be explicitly notified of the status of the Bluetooth headset.

For example, in another specific scenario, refer to Scenario 5 shown in FIG. 3E. The Bluetooth headset processes the first audio service of the mobile phone 1, and then the Bluetooth headset changes from the play state to the idle state. As shown in Scenario 5 in FIG. 5, the audio control method may include the following steps.

S502: The Bluetooth headset plays the first audio stream transmitted by the mobile phone 1.

S507: The mobile phone 1 stops sending the first audio stream; and correspondingly, the Bluetooth headset stops receiving the first audio stream.

S508: The Bluetooth headset sends a fourth status notification message to the mobile phone 2, where the fourth status notification message indicates that the status of the audio device is the idle state.

Correspondingly, the mobile phone 2 receives the fourth status notification message sent by the Bluetooth headset.

S509: The mobile phone 2 displays fourth notification information based on the fourth status notification message, where the fourth notification information indicates that the status of the audio device is the idle state.

Figure 7B:
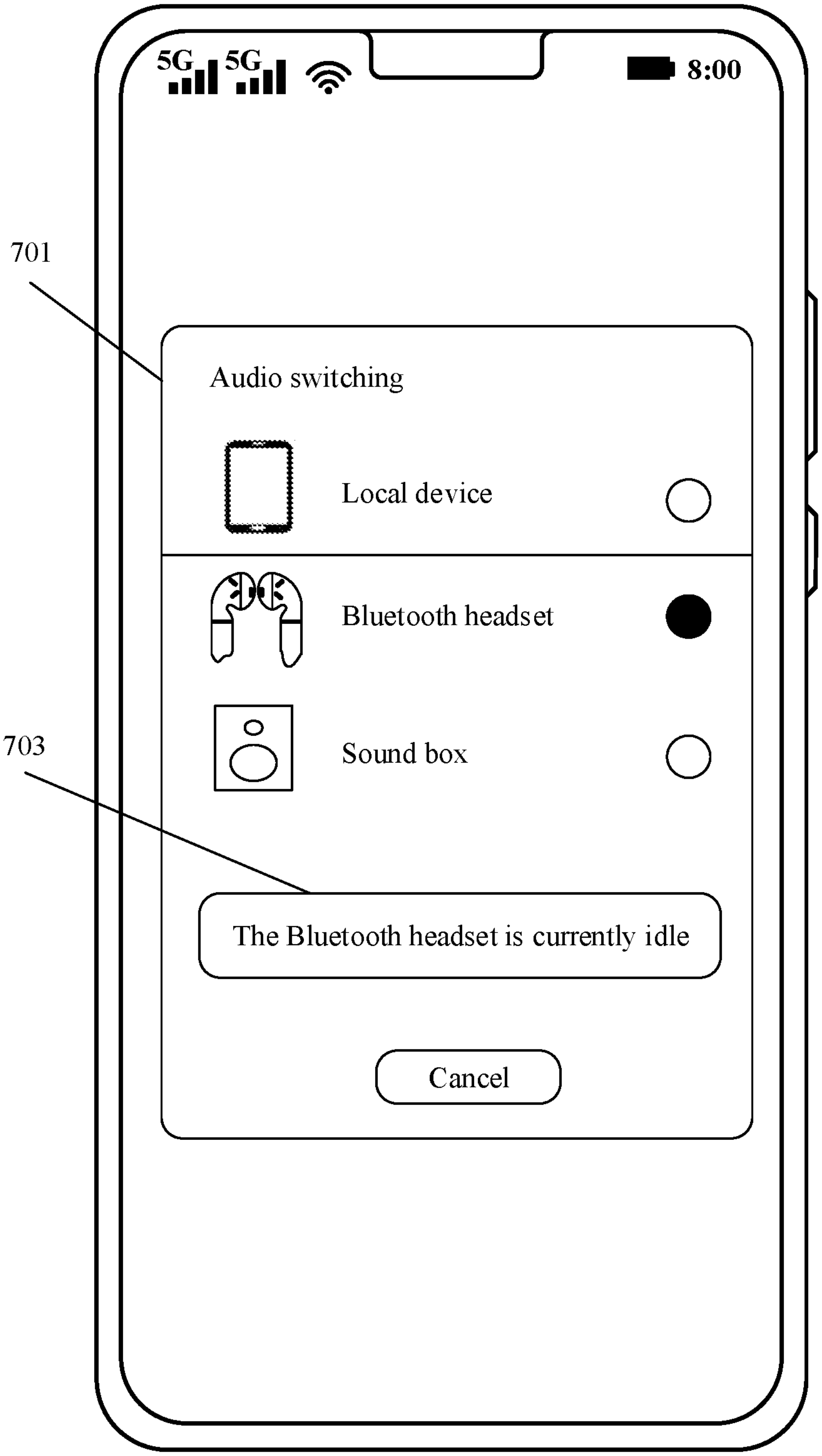

In this scenario, the mobile phone 2 is always an electronic device in a non-service state. The status notification message is sent to the electronic device in the non-service state by using the Bluetooth headset, so that the electronic device in the non-service state and the user can be notified of the status of the Bluetooth headset. For example, FIG. 7B shows an audio switching interface 701 displayed by the mobile phone 2 in Scenario 5. As shown in FIG. 7B, the audio switching interface 701 includes fourth notification information 703. For example, the fourth notification information 703 is a text "The Bluetooth headset is currently idle".

Optionally, the audio control method may further include the following step.

S511: The mobile phone 1 displays fourth notification information, where the fourth notification information indicates that the status of the audio device is the idle state.

In this scenario, the mobile phone 1 changes from an electronic device in a service state to an electronic device in a non-service state. The mobile phone 1 stops the first audio service, the Bluetooth headset stops processing the first audio service of the mobile phone 1, and the mobile phone 1 may learn the status of the Bluetooth headset. The mobile phone 1 displays the fourth notification information, so that the user can be explicitly notified of the status of the Bluetooth headset. For example, FIG. 6A shows an audio switching interface 601 displayed by the mobile phone 1 in Scenario 5. Refer to the foregoing descriptions. Details are not described herein again.

Optionally, before S511, the method may further include the following step.

S510: The Bluetooth headset sends a fourth status notification message to the mobile phone 1; and correspondingly, the mobile phone 1 receives the fourth status notification message sent by the Bluetooth headset.

Specifically, the status notification message is sent to the mobile phone 1 by using the Bluetooth headset, so that the mobile phone 1 and the user may be explicitly notified of the status of the Bluetooth headset.

For example, in still another specific scenario, as shown in Scenario 6 shown in FIG. 3F, the Bluetooth headset changes from processing the first audio service of the mobile phone 1 to processing the second audio service of the mobile phone 2. As shown in Scenario 6 in FIG. 5, the audio control method may include the following steps.

S502: The Bluetooth headset plays the first audio stream transmitted by the mobile phone 1.

S512: The mobile phone 2 sends a second audio stream to the Bluetooth headset; and correspondingly, the Bluetooth headset receives the second audio stream sent by the mobile phone 2.

S513: The Bluetooth headset stops playing the first audio stream.

S514: The Bluetooth headset plays the second audio stream.

S515: The Bluetooth headset sends a fifth status notification message to the mobile phone 1, where the fifth status notification message includes a service type of the second audio service and device information of the mobile phone 2.

Correspondingly, the mobile phone 1 receives the fifth status notification message sent by the Bluetooth headset.

S516: The mobile phone 1 displays fifth notification information based on the fifth status notification message, where the fifth notification information indicates the Bluetooth headset to process the second audio service of the mobile phone 2.

S517: The mobile phone 1 stops sending the first audio stream; and correspondingly, the Bluetooth headset stops receiving the first audio stream.

An execution sequence between S16 and S517 is not limited in this embodiment, and an execution sequence between S512 to S514 and S515 is not limited in this embodiment.

Figure 6C:
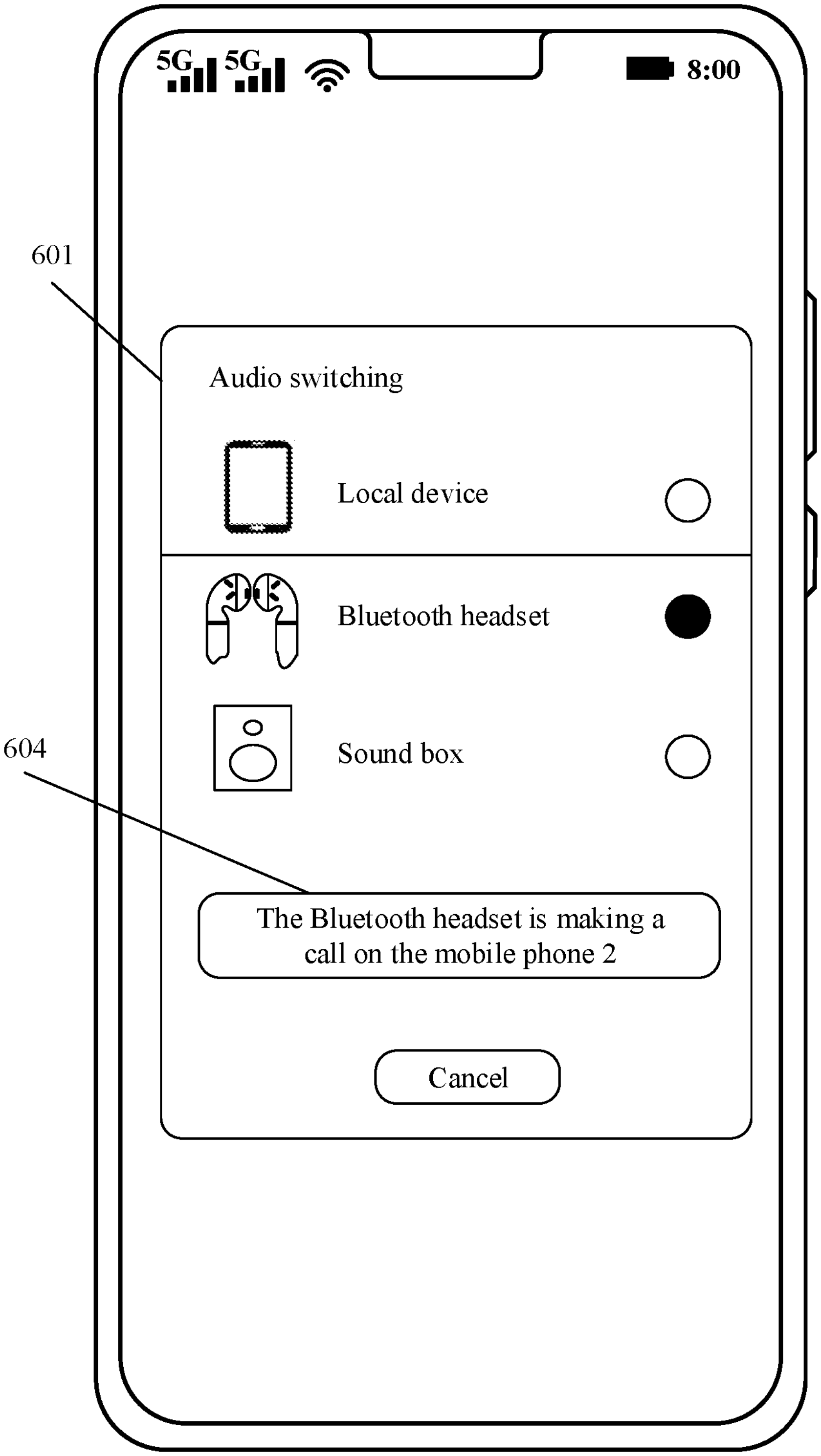

In this scenario, the mobile phone 1 changes from an electronic device in a service state to an electronic device in a non-service state, and the mobile phone 2 changes from an electronic device in a non-service state to an electronic device in a service state. The status notification message is sent to the mobile phone 1 by using the Bluetooth headset, so that the mobile phone 1 and the user may be notified of the status of the Bluetooth headset. For example, FIG. 6C shows an audio switching interface 601 displayed by the mobile phone 1 in Scenario 6. As shown in FIG. 6C, the audio switching interface 601 includes fifth notification information 604. It is assumed that the first audio service is playing music, and the second audio service is a call. For example, the fifth notification information 604 is a text "The Bluetooth headset is making a call on the mobile phone 2".

Optionally, the audio control method may further include the following step.

S519: The mobile phone 2 displays fifth notification information, where the fifth notification information indicates the Bluetooth headset to process the second audio service of the mobile phone 2.

Figure 7C:
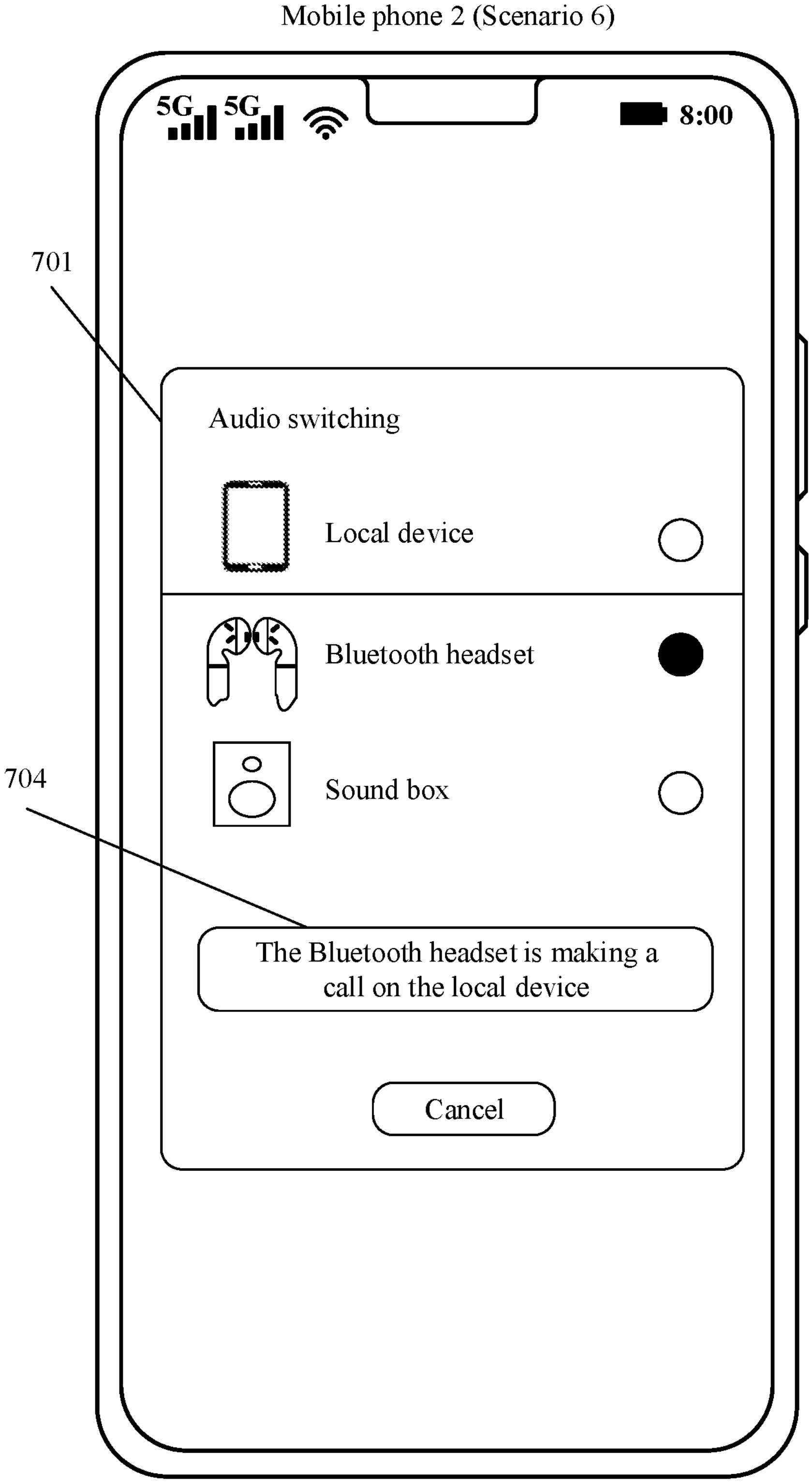

Specifically, the mobile phone 2 changes from an electronic device in a non-service state to an electronic device in a service state. The Bluetooth headset processes the second audio service of the mobile phone 2, and the mobile phone 2 may learn the status of the Bluetooth headset. The mobile phone 2 displays the fifth notification information, so that the user can be explicitly notified of the status of the Bluetooth headset. For example, FIG. 7C shows an audio switching interface 701 displayed by the mobile phone 2 in Scenario 6. As shown in FIG. 7C, the audio switching interface 701 includes fifth notification information 704. It is assumed that the first audio service is playing music, and the second audio service is a call. For example, the fifth notification information 704 is a text "The Bluetooth headset is making a call on the local device".

Optionally, before S519, the method may further include the following step.

S518: The Bluetooth headset sends a fifth status notification message to the mobile phone 2; and correspondingly, the mobile phone 2 receives the fifth status notification message sent by the Bluetooth headset.

Specifically, the status notification message is sent to the mobile phone 2 by using the Bluetooth headset, so that the mobile phone 2 and the user may be explicitly notified of the status of the Bluetooth headset.

Optionally, in another policy of the second-type application scenario, the audio device may periodically send a status notification message to the electronic device, to notify the electronic device of the status of the audio device in a timely manner, so that the electronic device can notify the user of the status of the audio device in a timely manner. This helps properly preempt the audio device, and meets an actual requirement of an audio service.

A sending period of the status notification message is not limited in this embodiment.

Optionally, in another embodiment of this application, an implementation of preempting the audio device is described. In this embodiment, the electronic device may learn a status of the audio device. When the electronic device needs to perform a target audio service on the audio device, the electronic device determines, based on the status of the audio device, whether the electronic device can preempt the audio device. If the audio device is in an idle state, the electronic device may directly perform the target audio service on the audio device, that is, the electronic device preempts the audio device in the idle state. If the audio device is in a play state, the electronic device determines, based on a priority of the target audio service and a priority of a current audio service of the audio device, whether the electronic device can preempt the audio device. When determining that the electronic device can preempt the audio device, the electronic device sends a first message to the audio device. There is a preset correspondence between a priority and a type of an audio service, and the electronic device stores the correspondence.

It can be learned that in this embodiment, the electronic device learns the status of the audio device, and the electronic device determines whether the electronic device can preempt the audio device, thereby reducing processing complexity of the audio device in a preemption process. A processing capability of the electronic device is usually better than that of the audio device. Therefore, efficiency and properness of preempting the audio device are improved, a problem that a high-priority service is suspended or interrupted, or cannot preempt use of the audio device in a preemption scenario is avoided, and an actual use requirement of an audio service is met.

The following describes, with reference to different application scenarios, the audio control method provided in this embodiment. Electronic devices include a mobile phone 1 and a mobile phone 2. The mobile phone 1 and the mobile phone 2 may establish an A2DP connection and/or an HFP connection to a Bluetooth headset.

Figure 8:
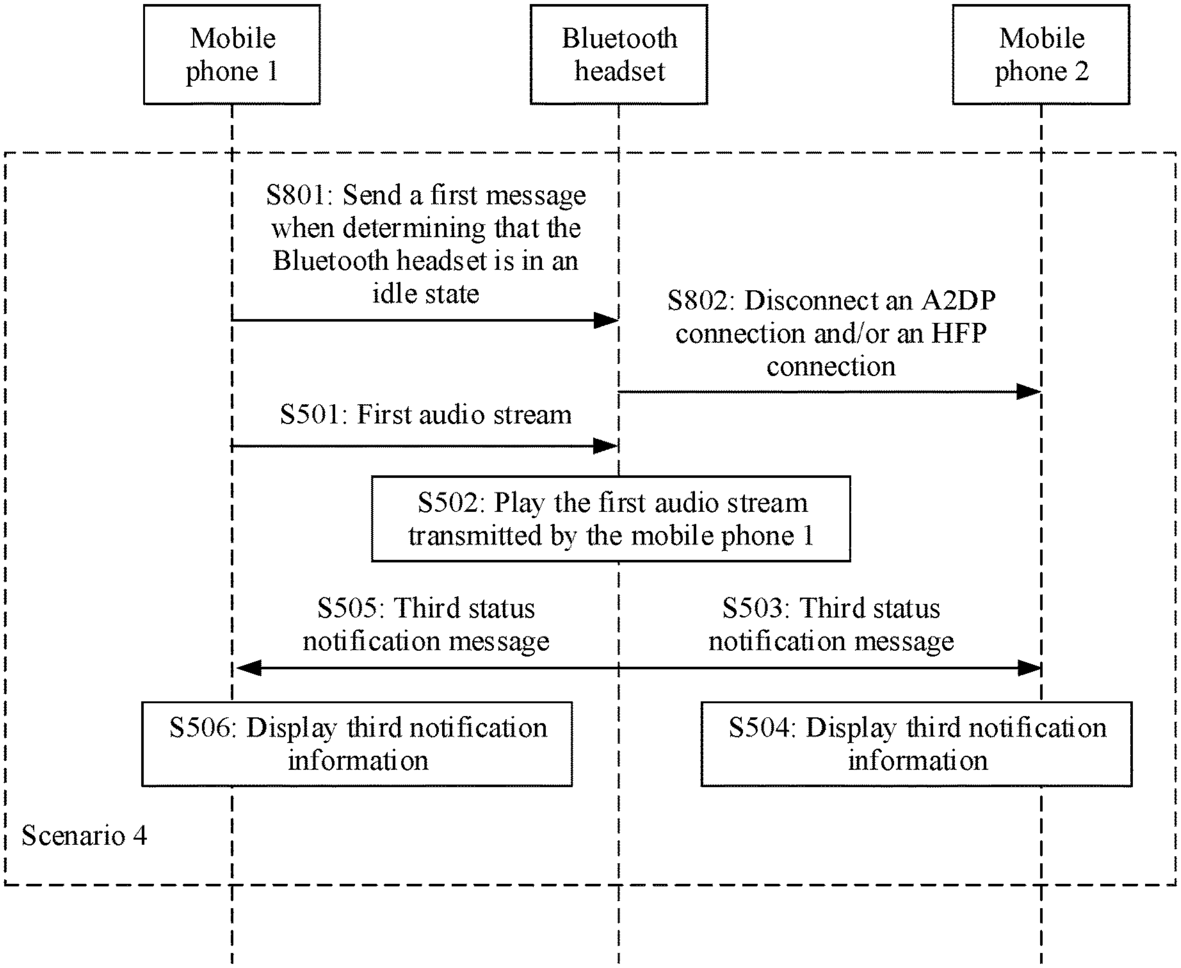
FIG. 8 is still another flowchart of an audio control method according to an embodiment of this application.

Optionally, in an application scenario, as shown in Scenario 4 shown in FIG. 3D, the Bluetooth headset is in the idle state. Based on a message procedure in Scenario 4 shown in FIG. 5, as shown in FIG. 8, before S501, the audio control method provided in this embodiment may further include the following steps.

5801: The mobile phone 1 sends a first message to the Bluetooth headset when determining that a Bluetooth headset is in an idle state, where the first message is used to request the Bluetooth headset to process a target audio service of the mobile phone 1; and correspondingly, the Bluetooth headset receives the first message sent by the mobile phone 1.

For example, in Scenario 4, the target audio service is the first audio service in the embodiment shown in FIG. 5, and is a media audio service. In this scenario, the Bluetooth headset is in the idle state, and the electronic device may directly perform the target audio service on the Bluetooth headset, to preempt the audio device in the idle state. The first message may be a message used to initiate an audio service in an existing audio service process. Optionally, if the target audio service is a call audio service, based on an HFP profile, the first message may be a +CIEV command in an AT command, and carries a field call=1, to indicate that a call is in progress. Optionally, if the target audio service is a media audio service, based on an A2DP profile, the first message may be an AVDTP START command in an audio/video distribution transport protocol (audio/video distribution transport protocol, AVDTP) command.

A sequence of performing S502 and S503 by the Bluetooth headset is not limited in this embodiment. It may be understood that a time point for performing S502 by the Bluetooth headset depends on a time point for performing S501 by the mobile phone 1. Optionally, in an implementation, after receiving the first message sent by the mobile phone 1, the Bluetooth headset performs S503, to notify a mobile phone 2 of a status change of the Bluetooth headset, so that the mobile phone 2 notifies a user of a status of the Bluetooth headset.

Optionally, after S801, the method may further include the following step.

S802: The Bluetooth headset disconnects an A2DP connection and/or an HFP connection to the mobile phone 2 (an electronic device in a non-service state).

An execution sequence between S802 and S502, S503, or S505 is not limited in this embodiment.

Optionally, after the mobile phone 1 ends the target audio service and stops sending a first audio stream to the Bluetooth headset, the Bluetooth headset establishes an A2DP connection and/or an HFP connection to the mobile phone 2.

Figure 9:
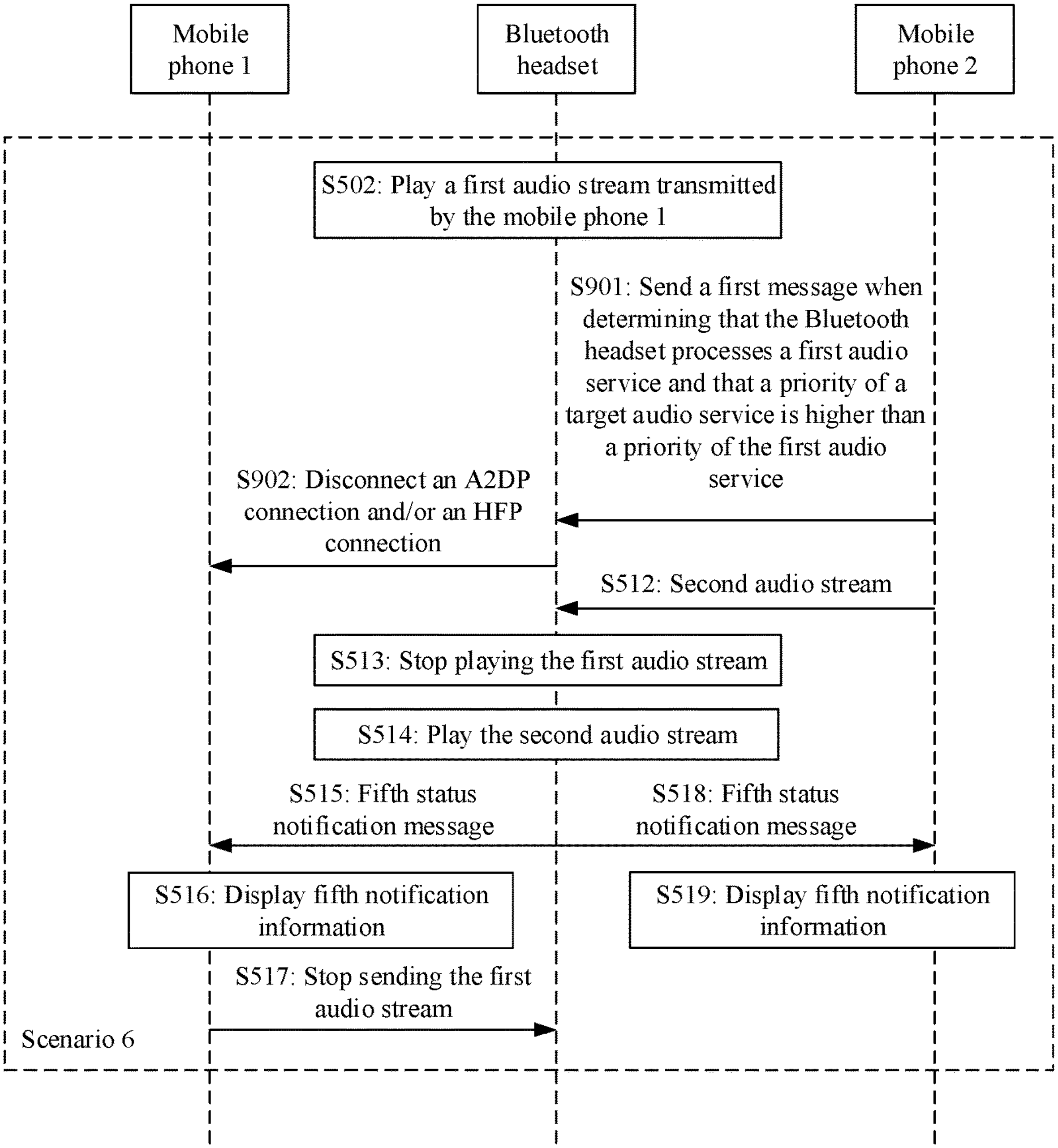
FIG. 9 is still another flowchart of an audio control method according to an embodiment of this application.

Optionally, in another application scenario, refer to Scenario 6 shown in FIG. 3F. The Bluetooth headset currently processes the first audio service of the mobile phone 1, and the mobile phone 2 initiates a target audio service with a higher priority. Based on a message procedure in Scenario 6 shown in FIG. 5, as shown in FIG. 9, before S512, the audio control method provided in this embodiment may further include the following steps.

S901: The mobile phone 2 sends a first message to the Bluetooth headset when determining that the Bluetooth headset processes a first audio service and determining that a priority of a target audio service is higher than a priority of the first audio service, where the first message is used to request the Bluetooth headset to process a target audio service of the mobile phone 2; and correspondingly, the Bluetooth headset receives the first message sent by the mobile phone 2.

Optionally, the first message may include a type of the target audio service and device information of the mobile phone 2.

For example, in Scenario 6, the target audio service is the second audio service in the embodiment shown in FIG. 5, and is a call audio service. The first audio service is a media audio service of the mobile phone 1. In this scenario, the Bluetooth headset is in a play state, and each electronic device in the system learns a type of an audio service currently performed by the Bluetooth headset. When the electronic device initiates the target audio service, if it is determined that the priority of the target audio service is higher than a priority of the audio service currently performed by the Bluetooth headset, the electronic device determines that the electronic device may preempt the audio device, and sends the first message to the audio device. In this way, a permission of using the audio device by a high-priority service is implemented, and an actual use requirement of an audio service is met.

Optionally, if the A2DP connection and/or the HFP connection between the mobile phone 2 and the Bluetooth headset are/is disconnected before the mobile phone 2 sends the first message to the Bluetooth headset, before the mobile phone 2 sends the first message to the Bluetooth headset, the method further includes: The mobile phone 2 establishes an A2DP connection and/or an HFP connection to the Bluetooth headset.

A sequence of performing S515, S513, and S514 by the Bluetooth headset is not limited in this embodiment. It may be understood that a time point for performing S514 by the Bluetooth headset depends on a time point for performing S512 by the mobile phone 2. Optionally, in an implementation, after receiving the first message sent by the mobile phone 2, the Bluetooth headset performs S515, to notify the mobile phone 1 of a status change of the Bluetooth headset, so that the mobile phone 1 notifies a user of a status of the Bluetooth headset and performs S517 in a timely manner.

Optionally, after S901, the method may further include the following step.

S902: The Bluetooth headset disconnects an A2DP connection and/or an HFP connection to the mobile phone 1 (an electronic device in a non-service state).

An execution sequence between S902 and S513, S514, S515, or S518 is not limited in this embodiment.

Optionally, after the mobile phone 2 ends the target audio service and stops sending a second audio stream to the Bluetooth headset, the Bluetooth headset establishes an A2DP connection and/or an HFP connection to the mobile phone 1. Optionally, the Bluetooth headset and the mobile phone 1 may resume playing of the first audio stream based on the A2DP connection or the HFP connection.

Figure 10:
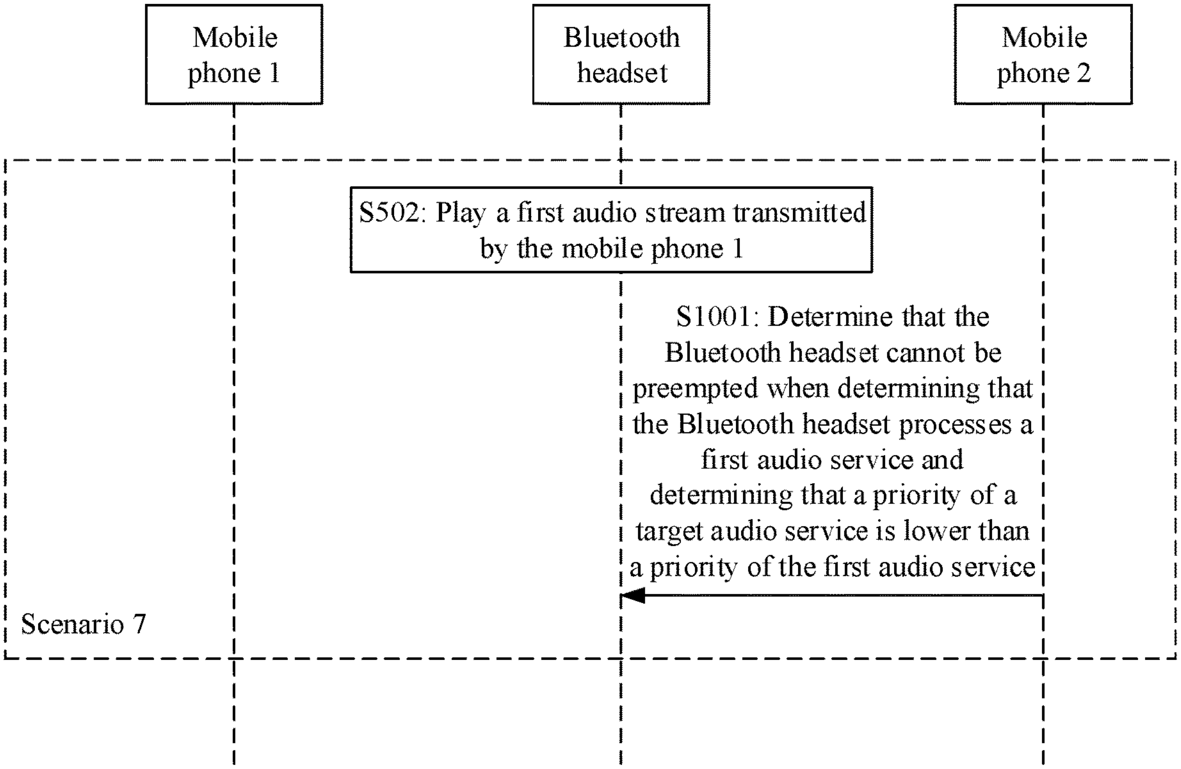
FIG. 10 is still another flowchart of an audio control method according to an embodiment of this application.

Optionally, in still another application scenario, refer to Scenario 7 shown in FIG. 3G. The Bluetooth headset currently processes the first audio service of the mobile phone 1, and the mobile phone 2 initiates a target audio service with a lower priority. As shown in FIG. 10, the audio control method provided in this embodiment may include the following steps.

S502: The Bluetooth headset plays the first audio stream transmitted by the mobile phone 1.

S1001: The mobile phone 2 determines that the mobile phone 2 cannot preempt the Bluetooth headset to process the target audio service of the mobile phone 2 when determining that the Bluetooth headset processes a first audio service and determining that a priority of a target audio service is lower than a priority of the first audio service.

For example, in Scenario 7, the target audio service may be a media audio service, and the first audio service is a call audio service of the mobile phone 1. In this scenario, the Bluetooth headset is in a play state, and each electronic device in the system learns a type of an audio service currently performed by the Bluetooth headset. When the electronic device initiates the target audio service, if it is determined that the priority of the target audio service is lower than a priority of the audio service currently performed by the Bluetooth headset, the electronic device determines that the electronic device cannot preempt the audio device, and does not send the first message to the audio device. Therefore, a low-priority service is prevented from preempting a permission of using the audio device by a high-priority service, and subsequent preemption performed by the high-priority service is also avoided. This does not cause the high-priority service to be suspended or interrupted, and meets an actual use requirement of an audio service.

It should be noted that when the priority of the target audio device is the same as the priority of the current audio service of the audio device, the electronic device may send the first message to preempt the audio device. Refer to a message procedure shown in FIG. 9. Alternatively, the electronic device does not send the first message, and does not preempt the audio device. Refer to a message procedure shown in FIG. 10.

Optionally, in another embodiment of this application, an implementation of preempting the audio device is described. In this embodiment, when the electronic device needs to perform the target audio service on the audio device, the electronic device sends the first message to the audio device, to request the audio device to perform the target audio service. The first message may include a type of the target audio service and device information of the electronic device initiating the target audio service. Correspondingly, after receiving the first message, the audio device determines, based on the status of the audio device, whether to perform the target audio service, and sends a first response message to the electronic device. The first response message indicates whether the audio device performs the target audio service. Specifically, if the audio device is in the idle state, that the audio device directly performs the target audio service may be understood as the following: The electronic device successfully preempts the audio device in the idle state. If the audio device is in the play state, the electronic device determines, based on the priority of the target audio service and the priority of the current audio service of the audio device, whether to perform the target audio device. There is a preset correspondence between a priority and a type of an audio service, and the audio device stores the correspondence.

It can be learned that in this embodiment, the audio device determines whether the target audio service of the electronic device can be performed, that is, the audio device determines whether the electronic device can preempt the audio device. This improves properness of preempting the audio device, and avoids a problem that a high-priority service is suspended or interrupted, or cannot preempt use of the audio device in a preemption scenario, and meets an actual requirement of an audio service.

The following describes, with reference to different application scenarios, the audio control method provided in this embodiment. Electronic devices include a mobile phone 1 and a mobile phone 2. The mobile phone 1 and the mobile phone 2 may establish an A2DP connection and/or an HFP connection to a Bluetooth headset.

Figure 11:
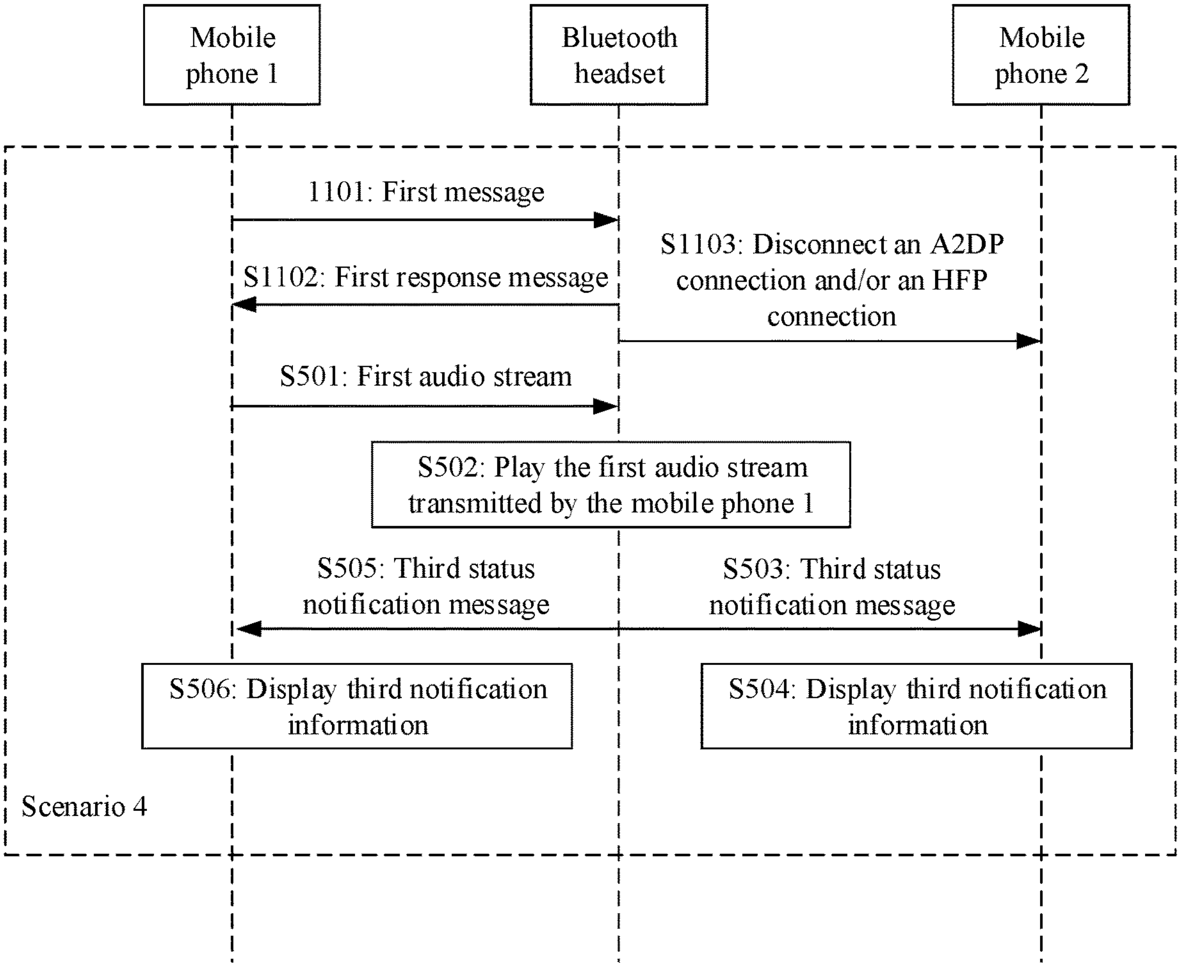
FIG. 11 is still another flowchart of an audio control method according to an embodiment of this application.

Optionally, in an application scenario, as shown in Scenario 4 shown in FIG. 3D, the Bluetooth headset is in the idle state. Based on a message procedure in Scenario 4 shown in FIG. 5, as shown in FIG. 11, before S501, the audio control method provided in this embodiment may further include the following steps.

S1101: The mobile phone 1 sends a first message to the Bluetooth headset, where the first message includes a type of a target audio service and device information of the mobile phone 1; and correspondingly, the Bluetooth headset receives the first message sent by the mobile phone 1.

For example, in Scenario 4, the target audio service is the first audio service in the embodiment shown in FIG. 5, and is a media audio service.

S1102: The Bluetooth headset sends a first response message to the mobile phone 1 when determining that the Bluetooth headset is in an idle state, where the first response message indicates the Bluetooth headset to perform the target audio service of the mobile phone 1.

In this scenario, the Bluetooth headset is in the idle state, and may directly perform the target audio service of the mobile phone 1. That is, the mobile phone 1 preempts the Bluetooth headset in the idle state.

A sequence of performing S502 and S503 by the Bluetooth headset is not limited in this embodiment. Optionally, in an implementation, after sending the first response message to the mobile phone 1, the Bluetooth headset performs S503, to notify the mobile phone 2 of a status change of the Bluetooth headset, so that the mobile phone 2 notifies a user of a status of the Bluetooth headset.

Optionally, after S1102, the method may further include the following step.

S1103: The Bluetooth headset disconnects an A2DP connection and/or an HFP connection to the mobile phone 2 (an electronic device in a non-service state).

An execution sequence between S1103 and S502, S503, or S505 is not limited in this embodiment.

Optionally, after the mobile phone 1 ends the target audio service and stops sending a first audio stream to the Bluetooth headset, the Bluetooth headset establishes an A2DP connection and/or an HFP connection to the mobile phone 2.

Figure 12:
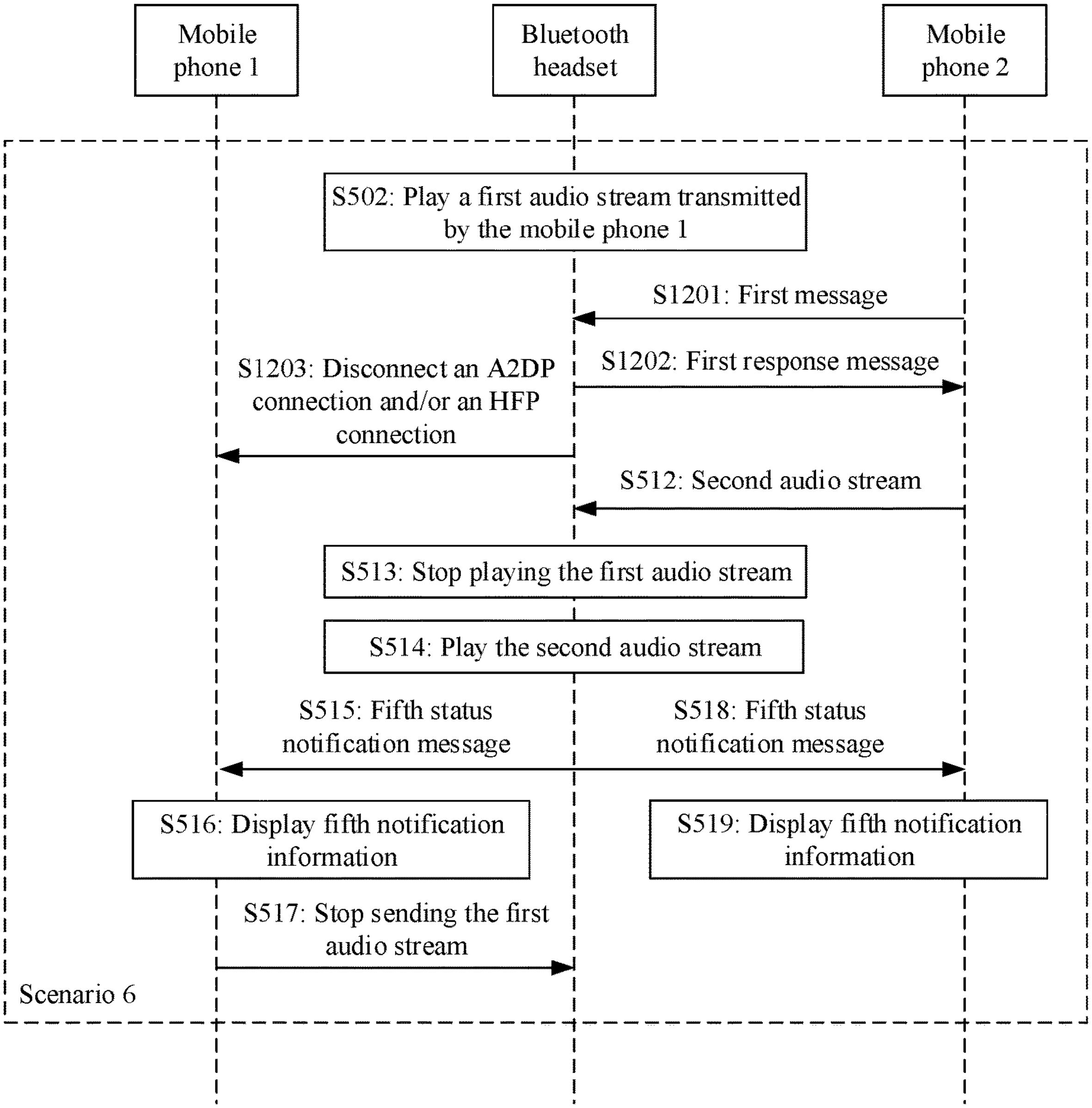
FIG. 12 is still another flowchart of an audio control method according to an embodiment of this application.
Figure 13:
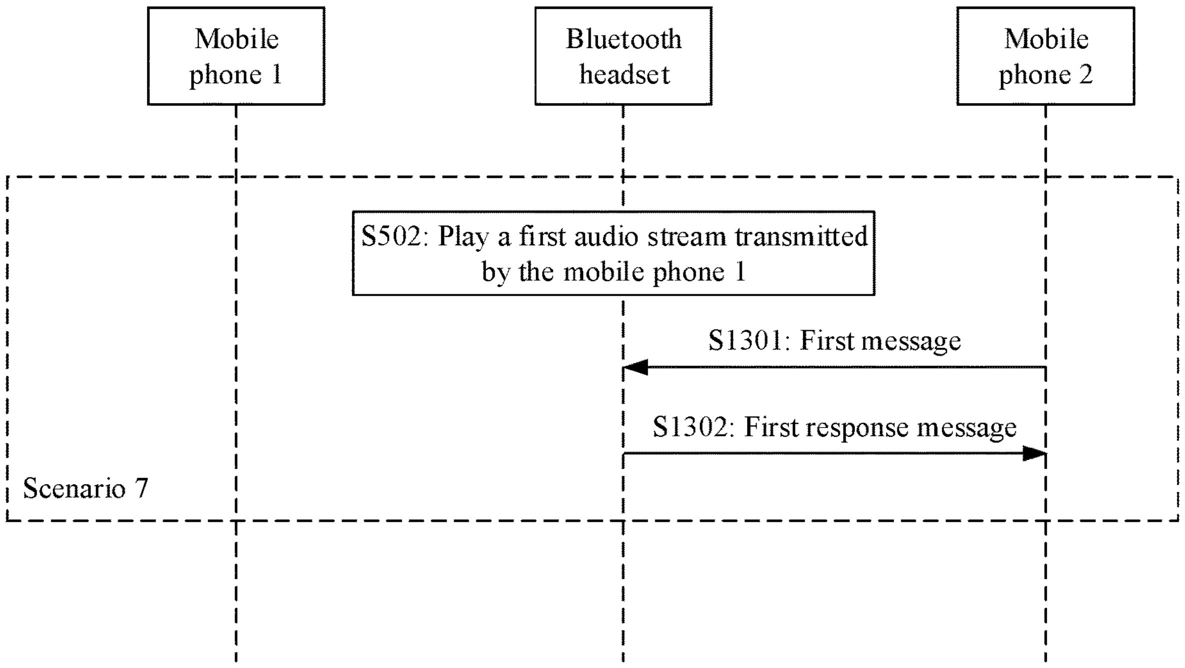
FIG. 13 is still another flowchart of an audio control method according to an embodiment of this application.

Optionally, in another application scenario, refer to Scenario 6 shown in FIG. 3F. The Bluetooth headset currently processes the first audio service of the mobile phone 1, and the mobile phone 2 initiates a target audio service with a higher priority. Based on a message procedure in Scenario 6 shown in FIG. 5, as shown in FIG. 12, before S512, the audio control method provided in this embodiment may further include the following steps.

S1201: The mobile phone 2 sends a first message to the Bluetooth headset, where the first message includes a type of a target audio service and device information of the mobile phone 2; and correspondingly, the Bluetooth headset receives the first message sent by the mobile phone 2.

For example, in Scenario 6, the target audio service is the second audio service in the embodiment shown in FIG. 5, and is a call audio service. A current audio service of the Bluetooth headset is a media audio service of the mobile phone 1.

S1202: The Bluetooth headset sends a first response message to the Bluetooth headset when determining that the Bluetooth headset is in a play state and determining that a priority of the target audio service is higher than a priority of the current audio service of the Bluetooth headset, where the first response message indicates that the Bluetooth headset performs the target audio service of the mobile phone 2.

In this scenario, the Bluetooth headset is in the play state, and performs the first audio service of the mobile phone 1. When determining that the priority of the target audio service initiated by the mobile phone 2 is higher than the priority of the first audio service, the Bluetooth headset determines that the mobile phone 2 can preempt the Bluetooth headset, and sends the first response message to the mobile phone 2. That is, the mobile phone 2 preempts the Bluetooth headset in the play state. In this way, a permission of using the audio device by a high-priority service is implemented, and an actual use requirement of an audio service is met.

A sequence of performing S515, S513, and S514 by the Bluetooth headset is not limited in this embodiment. Optionally, in an implementation, after sending the first response message to the mobile phone 2, the Bluetooth headset performs S515, to notify the mobile phone 1 of a status change of the Bluetooth headset, so that the mobile phone 1 notifies a user of a status of the Bluetooth headset and performs 5517 in a timely manner.

Optionally, after S1202, the method may further include the following step.

S1203: The Bluetooth headset disconnects an A2DP connection and/or an HFP connection to the mobile phone 1 (an electronic device in a non-service state).

An execution sequence between S902 and S513, S514, S515, or S518 is not limited in this embodiment.

Optionally, after the mobile phone 2 ends the target audio service and stops sending a second audio stream to the Bluetooth headset, the Bluetooth headset establishes an A2DP connection and/or an HFP connection to the mobile phone 1. Optionally, the Bluetooth headset and the mobile phone 1 may resume playing of the first audio stream based on the A2DP connection or the HFP connection.

Optionally, in still another application scenario, refer to Scenario 7 shown in FIG. 3G. The Bluetooth headset currently processes the first audio service of the mobile phone 1, and the mobile phone 2 initiates a target audio service with a lower priority. The audio control method provided in this embodiment may include the following steps.

S502: The Bluetooth headset plays the first audio stream transmitted by the mobile phone 1.

S1301: The mobile phone 2 sends a first message to the Bluetooth headset, where the first message includes a type of a target audio service and device information of the mobile phone 2; and correspondingly, the Bluetooth headset receives the first message sent by the mobile phone 2.

For example, in Scenario 7, the target audio service is a media audio service, and a current audio service of the Bluetooth headset is a voice audio service of the mobile phone 1.

S1302: The Bluetooth headset sends a first response message to the Bluetooth headset when determining that the Bluetooth headset is in a play state and determining that a priority of the target audio service is lower than a priority of the current audio service of the Bluetooth headset, where the first response message indicates that the Bluetooth headset cannot perform the target audio service of the mobile phone 2.

In this scenario, the Bluetooth headset is in the play state, and performs the first audio service of the mobile phone 1. When determining that the priority of the target audio service initiated by the mobile phone 2 is lower than the priority of the first audio service, the Bluetooth headset determines that the mobile phone 2 cannot preempt the Bluetooth headset, and sends the first response message to the mobile phone 2. In this way, a low-priority service is prevented from preempting a permission of using the audio device by a high-priority service. This does not cause the high-priority service to be suspended or interrupted, and meets an actual use requirement of an audio service.

It should be noted that when the priority of the target audio device is the same as the priority of the current audio service of the audio device, the audio device may perform the target audio service. Refer to a message procedure shown in FIG. 12. Alternatively, the audio device does not perform the target audio service. Refer to a message procedure shown in FIG. 13.

It may be understood that, to implement the foregoing functions, the electronic device and the audio device include corresponding hardware and/or software modules for performing the functions. In combination with example algorithm steps described in embodiments disclosed in this specification, this application may be implemented by hardware or a combination of hardware and computer software. Whether a function is performed by hardware or hardware driven by computer software depends on a particular application and a design constraint condition that are of a technical solution. A person skilled in the art may use different methods to implement the described functions for each particular application, but it should not be considered that the implementation goes beyond the scope of this application.

In embodiments of this application, the electronic device and the audio device may be divided into function modules based on the foregoing method examples. For example, each function module may be obtained through division for each corresponding function, or two or more functions may be integrated into one module. It should be noted that, in embodiments of this application, module division is an example, and is merely logical function division. In an actual implementation, another division manner may be used. It should be noted that a name of a module in embodiments of this application is an example, and the name of the module is not limited in an actual implementation.

Figure 14:
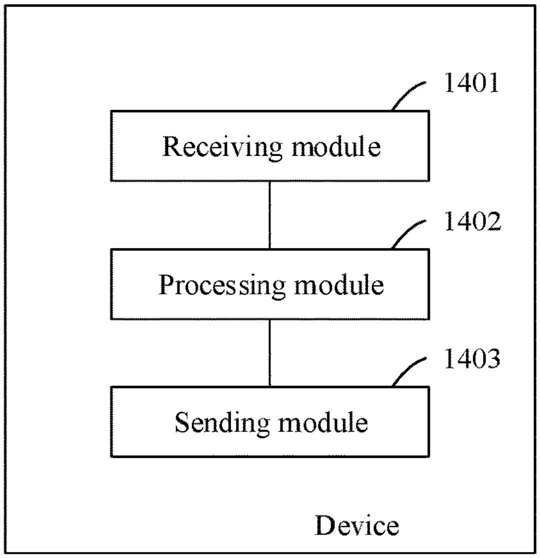
FIG. 14 is a schematic diagram of a structure of a device according to an embodiment of this application.

For example, FIG. 14 is a schematic diagram of a structure of a device according to an embodiment of this application. The device may be the electronic device or the audio device in embodiments of this application. As shown in FIG. 14, the device may include a receiving module 1401, a processing module 1402, and a sending module 1403.

Optionally, in an implementation, the device is an audio device, where the audio device establishes a first Bluetooth connection to a first electronic device, and establishes a second Bluetooth connection to a second electronic device. The audio device includes:

the processing module 1402, configured to generate a status notification message when determining that a status of the audio device changes, where the status notification message indicates a current status of the audio device; and the sending module 1403, configured to send the status notification message to at least one of the first electronic device and the second electronic device. Optionally, that a status of the audio device changes includes: The audio device changes from an idle state to a play state; or the audio device changes from a play state to an idle state.

Optionally, if the current status is a play state, the status notification message includes a service type of an audio service currently processed by the audio device and device information of an electronic device initiating the audio service; or if the current status is an idle state, the status notification message indicates that the audio device is in the idle state. Optionally, the sending module 1403 is specifically configured to:

send the status notification message to an electronic device in a non-service state, where the electronic device in the non-service state is an electronic device that is in the first electronic device and the second electronic device and that does not perform an audio service on the audio device.

Optionally, the electronic device in the non-service state includes: an electronic device that does not initiate an audio service; and/or an electronic device that initiates an audio service but does not perform the audio service on the audio device.

Optionally, the audio device is in the idle state before the status of the audio device changes. The audio device further includes the receiving module 1401, and the receiving module 1401 is configured to receive a first message sent by the first electronic device, where the first message is used to request the audio device to perform a first audio service of the first electronic device.

Optionally, the receiving module 1401 is specifically configured to receive the first message sent by the first electronic device through an echo channel of an L2CAP.

Optionally, the sending module 1403 is specifically configured to send the status notification message to the second electronic device, where the status notification message includes a service type of the first audio service and device information of the first electronic device.

Optionally, the receiving module 1401 is further configured to receive a first audio stream that is of the first audio service and that is sent by the first electronic device; and the processing module 1402 is further configured to play the first audio stream.

Optionally, the audio device processes the first audio service of the first electronic device before the status of the audio device changes. The audio device further includes the receiving module 1401, and the receiving module 1401 is configured to:

receive a second message sent by the second electronic device, where the second message is used to request the audio device to perform a second audio service of the second electronic device, and a priority of the second audio service is higher than a priority of the first audio service.

Optionally, the sending module 1403 is specifically configured to:

send the status notification message to the first electronic device, where the status notification message includes a service type of the second audio service and device information of the second electronic device.

Optionally, the receiving module 1401 is further configured to receive a second audio stream that is of the second audio service and that is sent by the second electronic device; and the processing module 1402 is further configured to play the second audio stream.

Optionally, in another implementation, the device is an electronic device, and serves as a first electronic device, where the first electronic device establishes a first Bluetooth connection to an audio device, and the audio device further establishes a second Bluetooth connection to a second electronic device. The first electronic device includes:

a receiving module 1401, configured to receive a status notification message sent by the audio device, where the status notification message indicates a current status of the audio device; and a processing module 1402, configured to display notification information based on the status notification message, where the notification information indicates the current status of the audio device.

Optionally, when the current status is a play state, the status notification message includes a service type of an audio service currently processed by the audio device and device information of an electronic device initiating the audio service, and the notification information specifically indicates the audio device to process the audio service of the electronic device, where the electronic device is the first electronic device or the second electronic device.

Optionally, when the current status is an idle state, the status notification message indicates that the audio device is in the idle state, and the notification information specifically indicates that the audio device is in the idle state.

Optionally, the first electronic device is an electronic device in a non-service state, and the electronic device in the non-service state is an electronic device that does not perform an audio service on the audio device.

Optionally, the first electronic device does not initiate an audio service; or the first electronic device initiates an audio service but does not perform the audio service on the audio device.

Optionally, the first electronic device further includes a sending module 1403. When the processing module 1402 determines, based on the current status, that the audio device can perform a first audio service of the first electronic device, the sending module 1403 is configured to send a first message to the audio device, where the first message is used to request the audio device to perform the first audio service of the first electronic device.

Optionally, the sending module 1403 is specifically configured to send the first message to the audio device through an echo channel of an L2CAP.

Optionally, the processing module 1402 is specifically configured to: if the current status is an idle state, determine that the audio device can perform the first audio service. Optionally, the processing module 1402 is specifically configured to:

if the audio device currently processes a second audio service of the second electronic device, when a priority of the first audio service is higher than a priority of the second audio device, determine that the audio device can perform the first audio service.

Optionally, in still another implementation, the device is an audio device, and includes:

a processing module 1402, configured to establish a Bluetooth connection to a first electronic device; and a sending module 1403, configured to send a first status notification message to the first electronic device when the audio device is in a play state, where the first status notification message includes a service type of a first audio service currently processed by the audio device and device information of a second electronic device initiating the first audio service.

Optionally, the sending module 1403 is further configured to send a second status notification message to the first electronic device when the audio device is in an idle state, where the second status notification message indicates that the audio device is in the idle state.

Optionally, in still another implementation, the device is an electronic device, serves as a first electronic device, and includes:

a processing module 1402, configured to establish a Bluetooth connection to an audio device; and a receiving module 1401, configured to receive a first status notification message sent by the audio device, where the first status notification message includes a service type of a first audio service currently processed by the audio device and device information of a second electronic device initiating the first audio service.

The processing module 1402 is further configured to display first notification information based on the first status notification message, where the first notification information indicates the audio device to process the first audio service of the second electronic device.

Optionally, the receiving module 1401 is further configured to receive a second status notification message sent by the audio device, where the second status notification message indicates that the audio device is in an idle state.

Optionally, the processing module 1402 is further configured to: if the receiving module 1401 does not receive a status notification message sent by the audio device within preset duration, determine that the audio device is in the idle state.

Optionally, the processing module 1402 is further configured to display second notification information, where the second notification information indicates that the audio device is in the idle state.

The device provided in this embodiment is configured to perform operations performed by the electronic device or the audio device in the foregoing method embodiments. Technical principles and technical effects are similar to those in the foregoing method embodiments. Details are not described herein again.

Figure 15:
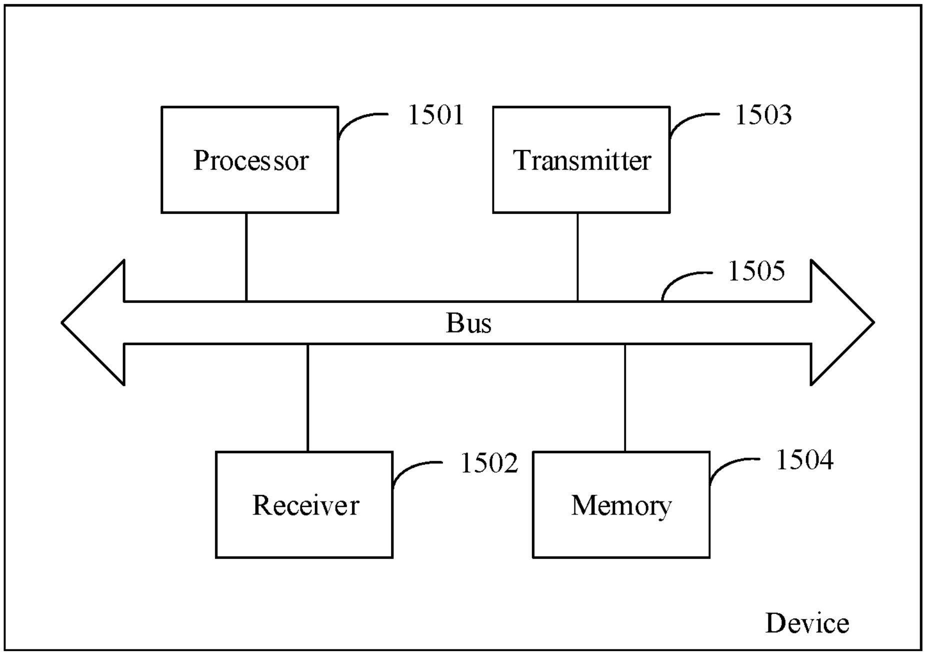
FIG. 15 is a schematic diagram of another structure of a device according to an embodiment of this application.

FIG. 15 shows a structure of a device according to an embodiment of this application. The device may be an electronic device or an audio device. The device includes a processor 1501, a receiver 1502, a transmitter 1503, a memory 1504, and a bus 1505. The processor 1501 includes one or more processing cores. The processor 1501 runs a software program and a module, to execute various functional applications and perform information processing. The receiver 1502 and the transmitter 1503 may be implemented as a communication component, and the communication component may be a baseband chip. The memory 1504 is connected to the processor 1501 by using the bus 1505. The memory 1504 may be configured to store at least one program instruction, and the processor 1501 is configured to execute the at least one program instruction, to implement the technical solutions in the foregoing embodiments. Implementation principles and technical effects thereof are similar to those of the foregoing related method embodiments. Details are not described herein again.

After the device is powered on, the processor may read a software program in the memory, interpret and execute instructions of the software program, and process data of the software program. When the processor needs to send data through an antenna, after performing baseband processing on to-be-sent data, the processor outputs a baseband signal to a control circuit in the control circuit. The control circuit performs radio frequency processing on the baseband signal and then sends a radio frequency signal to the outside in a form of an electromagnetic wave through the antenna. When data is sent to the device, the control circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 15 shows only one memory and one processor. In an actual device, there may be a plurality of processors and memories. The memory may alternatively be referred to as a storage medium, a storage device, or the like. This is not limited in embodiments of this application.

In an optional implementation, the processor may include a baseband processor and a central processing unit. The baseband processor is mainly configured to process communication data, and the central processing unit is mainly configured to execute a software program and process data of the software program. A person skilled in the art may understand that the baseband processor and the central processing unit may be integrated into one processor, or may be independent processors, and are connected by using a bus or the like. A person skilled in the art may understand that the device may include a plurality of baseband processors to adapt to different network standards, the device may include a plurality of central processing units to enhance a processing capability of the device, and components of the device may be connected by using various buses. The baseband processor may alternatively be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program to implement a baseband processing function. The memory may be integrated into the processor, or may be independent of the processor. The memory includes a cache Cache, and may store frequently accessed data/instructions.

In embodiments of this application, the processor may be a general-purpose processor, a digital signal processor, an application-specific integrated circuit, a field programmable gate array or another programmable logic device, a discrete gate or a transistor logic device, or a discrete hardware component, so that the methods, steps, and logical block diagrams that are disclosed in embodiments of this application can be implemented or performed. The general-purpose processor may be a microprocessor, any conventional processor, or the like. The steps of the method disclosed with reference to embodiments of this application may be directly performed by a hardware processor, or may be performed by using a combination of hardware in the processor and a software module.

In this embodiment of this application, the memory may be a non-volatile memory, for example, a hard disk drive (hard disk drive, HDD) or a solid-state drive (solid-state drive, SSD), or may be a volatile memory (volatile memory), for example, a random access memory (random access memory, RAM). The memory is any other medium that can be configured to carry or store expected program code in a form of an instruction structure or a data structure and that can be accessed by a computer, but is not limited thereto.

The memory in embodiments of this application may alternatively be a circuit or any other apparatus that can implement a storage function, and is configured to store program instructions and/or data. All or a part of the method provided in the embodiments of this application may be implemented by using software, hardware, firmware, or any combination thereof When software is used to implement embodiments, all or some of the embodiments may be implemented in a form of a computer program product. The computer program product includes one or more computer instructions. When the computer program instructions are loaded and executed on the computer, all or some of the processes or functions according to embodiments of this application are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium (for example, an SSD), or the like.

An embodiment of this application provides a computer program product. When the computer program product runs on a device, the device is enabled to perform the technical solutions in the foregoing embodiments. Implementation principles and technical effects thereof are similar to those of the foregoing related embodiments. Details are not described herein again. The device may be an electronic device or an audio device.

An embodiment of this application provides a computer-readable storage medium, where the computer-readable storage medium stores program instructions. When the program instructions are executed by a device, the device is enabled to perform the technical solutions in the foregoing embodiments. Implementation principles and technical effects thereof are similar to those of the foregoing related embodiments. Details are not described herein again. The device may be an electronic device or an audio device.

In conclusion, the foregoing embodiments are merely intended for describing the technical solutions of this application, rather than limiting this application. Although this application is described in detail with reference to the foregoing embodiments, a person of ordinary skill in the art should understand that modifications may still be made to the technical solutions described in the foregoing embodiments, or equivalent replacements may still be made to some technical features thereof These modifications or replacements do not make the essence of the corresponding technical solutions depart from the scope of the technical solutions of embodiments of this application.

What is claimed is:

1. A method for audio control, applied to an audio device, wherein the audio device establishes a first Bluetooth connection to a first electronic device, and establishes a second Bluetooth connection to a second electronic device, and the method comprises:

when the audio device is connected to both the first electronic device and the second electronic device and the audio device is in an idle state, receiving a first message from the first electronic device, wherein the first message preempts the audio device in the idle state and initiates a first audio service on the audio device;

in response to receiving the first message from the first electronic device, generating a status notification message, wherein the status notification message indicates a current status of the audio device; and sending the status notification message to at least one of the first electronic device or the second electronic device.

2. The method according to claim 1, wherein that a status of the audio device changes comprises:

the audio device changes from an idle state to a play state; or the audio device changes from a play state to an idle state.

3. The method according to claim 1, wherein in response to determining that the current status is a play state, the status notification message comprises a service type of an audio service currently processed by the audio device and device information of an electronic device initiating the audio service; or in response to determining that the current status is an idle state, the status notification message indicates that the audio device is in the idle state.

4. The method according to claim 1, wherein the sending the status notification message comprises:

sending the status notification message to an electronic device in a non-service state, wherein the electronic device in the non-service state is an electronic device that is in the first electronic device and the second electronic device and that does not perform an audio service on the audio device.

5. The method according to claim 4, wherein the electronic device in the non-service state comprises at least one of:

an electronic device that does not initiate an audio service; or an electronic device that initiates an audio service but does not perform the audio service on the audio device.

6. The method according to claim 1, wherein the receiving a first message comprises:

receiving the first message through an echo channel of a logical link control and adaptation protocol (L2CAP).

7. The method according to claim 1, wherein the status notification message comprises a service type of the first audio service and device information of the first electronic device.

8. The method according to claim 1, wherein the method further comprises:

receiving a first audio stream that is of the first audio service and that is sent by the first electronic device; and playing the first audio stream.

9. The method according to claim 1, wherein the audio device processes the first audio service of the first electronic device before the status of the audio device changes, and the method further comprises:

receiving a second message sent by the second electronic device, wherein the second message requests the audio device to perform a second audio service of the second electronic device, and a priority of the second audio service is higher than a priority of the first audio service.

10. The method according to claim 9, wherein the sending the status notification message to at least one of the first electronic device or the second electronic device comprises:

sending the status notification message to the first electronic device, wherein the status notification message comprises a service type of the second audio service and device information of the second electronic device.

11. The method according to claim 9, wherein the method further comprises:

receiving a second audio stream that is of the second audio service and that is sent by the second electronic device; and playing the second audio stream.

12. A method for audio control, applied to a first electronic device, wherein the first electronic device establishes a first Bluetooth connection to an audio device, the audio device further establishes a second Bluetooth connection to a second electronic device, and the method comprises:

when the audio device is connected to both the first electronic device and a second electronic device and the audio device is in an idle state, sending a first message from the first electronic device to the audio device, wherein the first message preempts the audio device in the idle state and initiates a first audio service on the audio device;

receiving a status notification message sent by the audio device, wherein the status notification message indicates a current status of the audio device; and displaying notification information based on the status notification message, wherein the notification information indicates the current status of the audio device.

13. The method according to claim 12, wherein in response to determining that the current status is a play state, the status notification message comprises a service type of an audio service currently processed by the audio device and device information of an electronic device initiating the audio service, and the notification information specifically indicates the audio device to process the audio service of the electronic device, wherein the electronic device is the first electronic device or the second electronic device.

14. The method according to claim 12, wherein in response to determining that the current status is an idle state, the status notification message indicates that the audio device is in the idle state, and the notification information specifically indicates that the audio device is in the idle state.

15. The method according to claim 12, wherein the first electronic device is an electronic device in a non-service state, and the electronic device in the non-service state is an electronic device that does not perform an audio service on the audio device.

16. The method according to claim 15, wherein the first electronic device does not initiate an audio service; or the first electronic device initiates an audio service but does not perform the audio service on the audio device.

17. The method according to claim 12, wherein the sending a first message comprises:

sending the first message to the audio device through an echo channel of a logical link control and adaptation protocol (L2CAP).

18. An audio device, comprising at least one processor and at least one memory coupled to the at least one processor, wherein the at least one memory stores programming instructions for execution by the at least one processor to cause the audio device to perform operations comprising:

when the audio device is connected to both a first electronic device and a second electronic device and the audio device is in an idle state, receiving a first message from the first electronic device, wherein the first message preempts the audio device in the idle state and initiates a first audio service on the audio device;

in response to receiving the first message from the first electronic device, generating a status notification message, wherein the status notification message indicates a current status of the audio device; and sending the status notification message to at least one of the first electronic device or the second electronic device.

19. The audio device according to claim 18, wherein the receiving a first message comprises:

receiving the first message through an echo channel of a logical link control and adaptation protocol (L2CAP).

20. The audio device according to claim 18, wherein the status notification message comprises a service type of the first audio service and device information of the first electronic device.

* * * * *